US012699986B2

(12) United States Patent
Badal-Badalian et al.

(10) Patent No.: US 12,699,986 B2
(45) Date of Patent: Aug. 4, 2026

(54) SYSTEM, PROCESS AND DEVICE FOR E-COMMERCE TRANSACTIONS

(71) Applicant: ROYAL BANK OF CANADA, Montreal (CA)

(72) Inventors: Arnold Badal-Badalian, Toronto (CA); Seung Bong Baek, Toronto (CA); Syed Ahmar Imam, Toronto (CA); Benoit Germain, Toronto (CA); Anuradha Devi Dodda, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 573 days.

(21) Appl. No.: 15/822,052

(22) Filed: Nov. 24, 2017

(65) Prior Publication Data

US 2018/0150830 A1     May 31, 2018

Related U.S. Application Data

(60) Provisional application No. 62/533,519, filed on Jul. 17, 2017, provisional application No. 62/426,388, filed on Nov. 25, 2016.

(51) Int. Cl.
*G06Q 20/36* (2012.01)
*G06Q 20/12* (2012.01)
(Continued)

(52) U.S. Cl.
CPC ............. *G06Q 20/36* (2013.01); *G06Q 20/12* (2013.01); *G06Q 20/20* (2013.01); *G06Q 20/227* (2013.01);
(Continued)

(58) Field of Classification Search
CPC ..... G06Q 20/385; G06Q 20/40; G06Q 20/322
See application file for complete search history.

(56) References Cited

U.S. PATENT DOCUMENTS 7,548,889 B2 * 6/2009 Bhambri ................ G06Q 20/12
705/50
8,041,338 B2 10/2011 Chen et al.
(Continued)

FOREIGN PATENT DOCUMENTS

WO 2016007108 A1 1/2016

OTHER PUBLICATIONS

"Urien et al., Secure Mobile Payments Based on Cloud Services : Concepts And Experiments, 2016, 2016 IEEE 2nd International Conference on Big Data Security on Cloud, IEEE International Conference on High Performance and Smart Computing, IEEE International Conference on Intelligent Data and Security" (Year: 2016).*

(Continued)

*Primary Examiner* — Patrick Mcatee
*Assistant Examiner* — Sima Asgari
(74) *Attorney, Agent, or Firm* — Norton Rose Fulbright Canada LLP

(57) ABSTRACT

Systems, devices and processes for electronic commerce payment processing using a handle and a mobile device with a mobile wallet application installed thereon. The handle may be used at a merchant website to process the electronic commerce payment for instead of providing payment information and/or personally identifiable information. That is, the handle may not include payment information and/or personally identifiable information.

24 Claims, 32 Drawing Sheets

(51) Int. Cl.

| | |
|---|---|
| *G06Q 20/20* | (2012.01) |
| *G06Q 20/22* | (2012.01) |
| *G06Q 20/32* | (2012.01) |
| *G06Q 20/38* | (2012.01) |
| *G06Q 20/40* | (2012.01) |
| *G06Q 20/42* | (2012.01) |
| *G06Q 30/06* | (2023.01) |
| *G06K 19/06* | (2006.01) |

(52) U.S. Cl.
CPC ....... *G06Q 20/322* (2013.01); *G06Q 20/3276* (2013.01); *G06Q 20/3278* (2013.01); *G06Q 20/3674* (2013.01); *G06Q 20/3821* (2013.01); *G06Q 20/38215* (2013.01); *G06Q 20/3829* (2013.01); *G06Q 20/383* (2013.01); *G06Q 20/385* (2013.01); *G06Q 20/401* (2013.01); *G06Q 20/4014* (2013.01); *G06Q 20/42* (2013.01); *G06Q 30/06* (2013.01); *G06K 19/06037* (2013.01); *G06Q 2220/00* (2013.01)

(56) References Cited

U.S. PATENT DOCUMENTS

| | | | |
|---|---|---|---|
| 8,774,781 B1 | 7/2014 | Speiser et al. | |
| 2003/0028481 A1* | 2/2003 | Flitcroft ................. | G06Q 20/40 |
| | | | 705/39 |
| 2005/0198377 A1* | 9/2005 | Ferguson .............. | G06F 16/958 |
| | | | 709/238 |
| 2010/0332410 A1* | 12/2010 | Brown ................. | G06Q 40/025 |
| | | | 705/37 |

| | | | |
|---|---|---|---|
| 2012/0179538 A1* | 7/2012 | Hines ................. | G06Q 30/0242 |
| | | | 705/14.43 |
| 2012/0239417 A1* | 9/2012 | Pourfallah ......... | G06Q 30/0601 |
| | | | 705/2 |
| 2013/0041770 A1* | 2/2013 | Raman .................. | G06Q 30/06 |
| | | | 705/21 |
| 2013/0212004 A1* | 8/2013 | Itwaru ................. | G06Q 20/102 |
| | | | 705/39 |
| 2013/0246260 A1 | 9/2013 | Barten et al. | |
| 2014/0108263 A1* | 4/2014 | Ortiz ..................... | G06Q 20/36 |
| | | | 705/44 |
| 2015/0052064 A1 | 2/2015 | Karpenko et al. | |
| 2015/0073907 A1* | 3/2015 | Purves .................. | G06Q 20/32 |
| | | | 705/14.58 |
| 2015/0269542 A1* | 9/2015 | Katz ..................... | G06Q 20/10 |
| | | | 705/44 |
| 2016/0019536 A1* | 1/2016 | Ortiz ..................... | G06Q 20/36 |
| | | | 705/67 |
| 2016/0253651 A1* | 9/2016 | Park ..................... | G06Q 20/322 |
| | | | 705/39 |
| 2017/0140350 A1* | 5/2017 | Jamkhedkar ....... | G06Q 20/3821 |
| 2017/0371468 A1* | 12/2017 | Sarin ............... | G06Q 20/40145 |
| 2018/0075451 A1* | 3/2018 | Yang .................. | G06Q 20/3829 |
| 2018/0108008 A1* | 4/2018 | Chumbley ......... | G06Q 20/3674 |

OTHER PUBLICATIONS

"Chang et al., A Secure Operational Model for Mobile Payments, 2014, The Scientific World Journal vol. 2014, Article ID 626243, 14 pages, http://dx.doi.org/10.1155/2014/626243" (Year: 2014).*
Written Opinion and International Search Report issued Feb. 27, 2018 in International Application No. PCT/CA2017/051414.

* cited by examiner

System
100

| Merchant DB – After Linking | |
|---|---|
| Merchant account name | RBC Wallet Link |
| 123-JohnDoe | 6e3df983-ea84... |

| User Name: | John Doe ▲▼ |
|---|---|
| Device Token: | Token is not linked |
| Select the Merchant: | Expedia ▲▼ |
| More... | ☑ Allow Push Notifications |
| | ( OK ) |

FIG. 10

Welcome John Doe

Weekend Getaway at Royal York Hotel

| | |
|---|---|
| One Night Stay: | $464.35 |
| Tax: | $ 50.37 |
| Total: | $524.72 |

Pay With RBC Wallet ~1102

Welcome John Doe

Weekend Getaway at Royal York Hotel

One Night Stay:     $464.35
Tax:     $ 50.37
Total:     $524.72

( Pay With RBC Wallet )~1102

1104

Send SMS to mobile phone to continue payment on RBC Wallet

Phone Number: | 4165552222 |    ( Send SMS )

Scan the QR-Code

~1106

Open the Wallet

Time Remaining... 4:52

1402

Touch ID for "RBC Wallet"

Use your fingerprint to sign in
45190200****6790.

Cancel

| User Name: | John Doe ⌃⌄ |
|---|---|
| Device Token: | Token is linked ( Unlink ) |
| Select the Merchant: | Expedia ⌃⌄ |
| More... | ☑ Allow Push Notifications |
| | ( OK ) |

FIG. 22

Weekend Getaway at Royal York Hotel

One Night Stay:    $464.35
Tax:    $ 50.37
Total:    $524.72

( Pay With RBC Wallet )~1102

9:41 AM

Q Search

Recent                                    ⊗

☐ RBC WALLET                    now
Pay with RBC Wallet          ← 2502
Please approve your purchase with Expedia

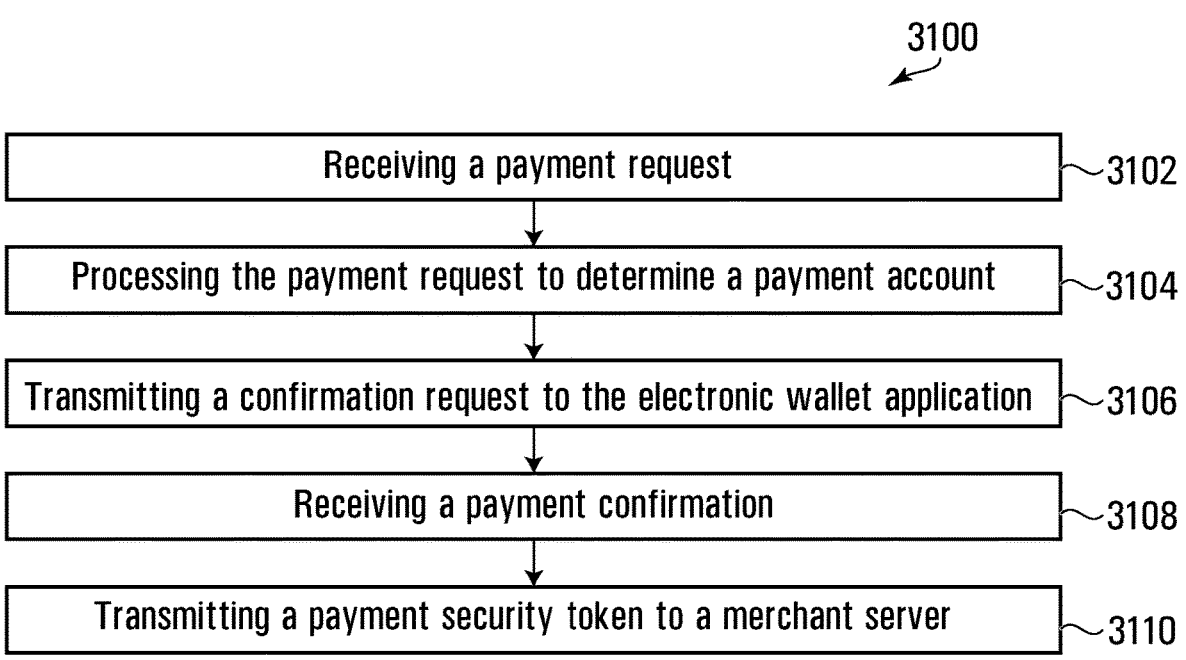

| | |
|---|---|
| Receiving a payment request | ~3102 |
| Processing the payment request to determine a payment account | ~3104 |
| Transmitting a confirmation request to the electronic wallet application | ~3106 |
| Receiving a payment confirmation | ~3108 |
| Transmitting a payment security token to a merchant server | ~3110 |

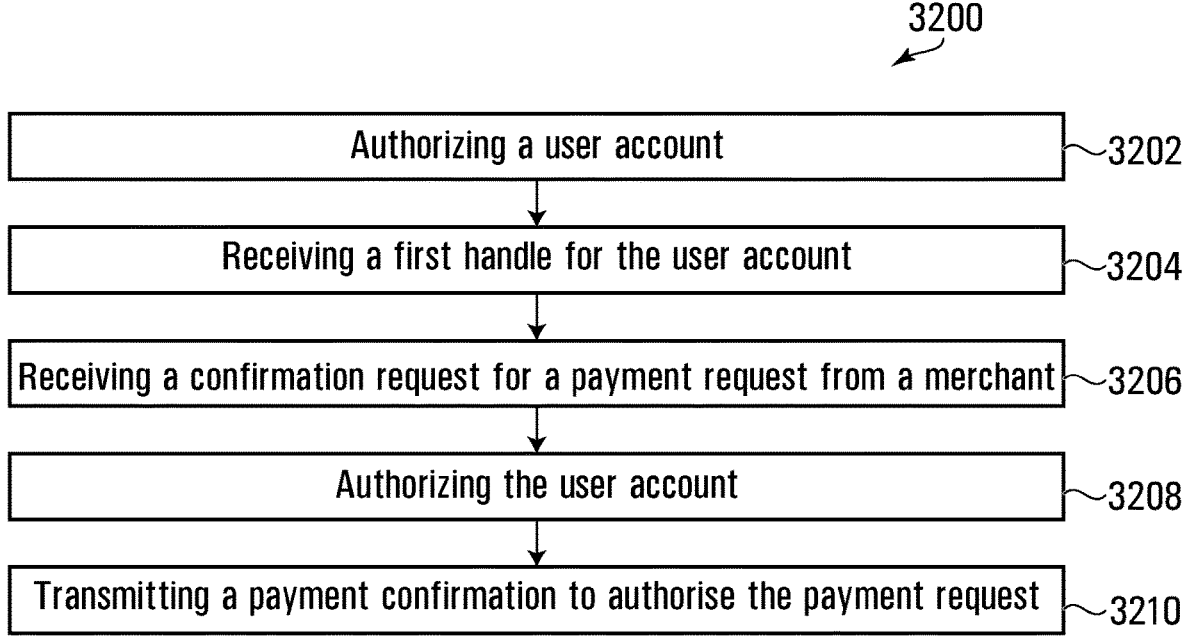

| | |
|---|---|
| Authorizing a user account | ~3202 |
| Receiving a first handle for the user account | ~3204 |
| Receiving a confirmation request for a payment request from a merchant | ~3206 |
| Authorizing the user account | ~3208 |
| Transmitting a payment confirmation to authorise the payment request | ~3210 |

FIG. 32

SYSTEM, PROCESS AND DEVICE FOR E-COMMERCE TRANSACTIONS

CROSS REFERENCE TO RELATED APPLICATIONS

The applications claims priority to U.S. Provisional Application No. 62/426,388 filed Nov. 25, 2016 and U.S. Provisional Application No. 62/533,519 filed Jul. 17, 2017.

FIELD

The improvements generally relate to the field of electronic transactions.

INTRODUCTION

Existing e-commerce and commerce workflows require customers to provide personally identifiable login information and/or payment details to a merchant website or device to process payment for the transaction. This may pose security risks.

SUMMARY

In accordance with an aspect, there is provided a system of processing payment for a transaction at an electronic wallet application on or accessible by a mobile device. The system can have the electronic wallet application having non-transitory computer-readable storage medium with computer-executable instructions for causing a processor of the mobile device to: authorize a user account of the electronic wallet application; trigger the display of a confirmation request on a display of the mobile device; provide a payment confirmation. The system can have a payment server having non-transitory computer-readable storage medium with computer-executable instructions for causing a processor of the payment server to: associate the user account with a first handle for processing payment using the electronic wallet application; receive a payment request to process payment for an electronic commerce transaction for a merchant website, the payment request indicating the first handle, a merchant identifier and transaction data; process the payment request to by verifying the user account associated with the first handle and the merchant identifier using a data repository, the user account identifying the electronic wallet application; transmit the confirmation request to the electronic wallet application, the confirmation request including at least a portion of the transaction data; receive the payment confirmation from the electronic wallet application; transmit, over a secured channel, a payment security token to a merchant server associated with the merchant website; and transmit an approval message to update the merchant website with payment confirmation notification.

In some embodiments, the electronic wallet application has the non-transitory computer-readable storage medium with the computer-executable instructions for causing the processor of the mobile device to generate and transmit a registration request to associate the user account with a first handle.

In some embodiments, the first handle is active to process a single payment request, wherein the payment server is configured to de-activate the first handle after transmitting the payment security token.

In some embodiments, the payment server has the non-transitory computer-readable storage medium with the computer-executable instructions for causing the processor to process a registration request to associate the user account with the first handle for processing payment using the electronic wallet application.

In some embodiments, the payment server has the non-transitory computer-readable storage medium with the computer-executable instructions for causing the processor to receive a first payment account, the first handle for processing payment using the first payment account, and associate the first payment account with the first handle.

In some embodiments, the payment server has the non-transitory computer-readable storage medium with the computer-executable instructions for causing the processor to: process a second registration request to associate the user account with a second handle for processing payment using a second payment account; receive a second payment request to process payment for another electronic commerce transaction, the payment request indicating the second handle, the merchant identifier or another merchant identifier, and additional transaction data; process the payment request to determine the user account associated with the second handle; transmit a confirmation request including at least a portion of the additional transaction data; authorize the user account of the electronic wallet application; receive another payment confirmation from the electronic wallet application to process payment using the second payment account; transmit another payment security token to the merchant server associated with the merchant identifier or another merchant server associated with the other merchant identifier, the other payment security token for the second payment account; and transmit an approval message for another payment confirmation notification.

In some embodiments, the first handle is active to process a single payment request, wherein the method comprises de-activating the first handle after transmitting the payment security token.

In some embodiments, the payment server has the non-transitory computer-readable storage medium with the computer-executable instructions for causing the processor to determine an encryption key associated with the merchant server and encrypting the payment security token using the encryption key, the encrypted payment security for decryption by the merchant server using a corresponding key.

In some embodiments, the payment server has the non-transitory computer-readable storage medium with the computer-executable instructions for causing the processor to connect with a payment software development kit to: receive a mobile payment selection; prompt for the first handle at a form field; and transmit the first handle as part of the payment request.

In some embodiments, the payment server has the non-transitory computer-readable storage medium with the computer-executable instructions for causing the processor to process a registration request to associate the user account with the first handle by verifying uniqueness of the first handle by determining that the first handle is different than all handles of a repository of handles stored on or accessible by the payment server.

In some embodiments, the payment server has the non-transitory computer-readable storage medium with the computer-executable instructions for causing the processor to process a registration request to associate the user account with the first handle comprises determining that the first handle is at least a minimum size.

In some embodiments, the payment server has the non-transitory computer-readable storage medium with the computer-executable instructions for causing the processor to generate or identify a unique handle for the first handle, the unique handle being different than all active handles of a repository of handles stored on or accessible by the payment server.

In some embodiments, the payment server has the non-transitory computer-readable storage medium with the computer-executable instructions for causing the processor to generate or identify a time sensitive handle for the first handle, the time sensitive handle being active for the electronic commerce transaction only for a defined period of time.

In some embodiments, the transaction data comprises user data, wherein processing the payment request to determine the user account associated with the first handle comprises determining that the user data matches stored data for the user account.

In some embodiments, the payment server has the non-transitory computer-readable storage medium with the computer-executable instructions for causing the processor to process a registration request to associate the first handle with the mobile device and the electronic mobile wallet, and process the payment request to determine the user account associated with the first handle by: determining the mobile device associated with the first handle, the mobile device being associated with the electronic wallet application.

In some embodiments, the payment server has the non-transitory computer-readable storage medium with the computer-executable instructions for causing the processor to authorize the user account of the electronic wallet application, and receive the payment confirmation from the electronic wallet application comprise receiving a valid login to the electronic wallet application.

In some embodiments, the payment server has the non-transitory computer-readable storage medium with the computer-executable instructions for causing the processor to transmit a transaction status update for display on the merchant website to indicate that the transaction is still pending until receipt of the payment confirmation.

In accordance with an aspect, there is provided a payment server for processing payment for a transaction. The payment server being connected to an electronic wallet application on or accessible by a mobile device, the payment server having non-transitory computer-readable storage medium with computer-instructions for causing a processor of the payment server to: associate a user account with a first handle for processing payment using the electronic wallet application; receive a payment request to process payment for an electronic commerce transaction at a merchant website, the payment request indicating the first handle, a merchant identifier and transaction data; process the payment request to by verifying the user account associated with the first handle and the merchant identifier using a data repository, the user account identifying the electronic wallet application; transmit the confirmation request to the electronic wallet application, the confirmation request including at least a portion of the transaction data; receive the payment confirmation from the electronic wallet application; transmit, over a secured channel, a payment security token to a merchant server associated with the merchant website; and transmit an approval message to update the merchant website with payment confirmation notification.

In some embodiments, the payment server has non-transitory computer-readable storage medium with computer-executable instructions for causing the processor to receive a registration request to associate the user account with a first handle.

In some embodiments, the first handle is active to process a single payment request, wherein the payment server is configured to de-activate the first handle after transmitting the payment security token.

In some embodiments, the payment server has non-transitory computer-readable storage medium with computer-executable instructions for causing the processor to process a registration request to associate the user account with the first handle for processing payment using the electronic wallet application.

In some embodiments, the payment server has non-transitory computer-readable storage medium with computer-executable instructions for causing the processor to receive a first payment account, the first handle for processing payment using the first payment account, and associate the first payment account with the first handle.

In some embodiments, the payment server has non-transitory computer-readable storage medium with computer-executable instructions for causing the processor to: process a second registration request to associate the user account with a second handle for processing payment using a second payment account; receive a second payment request to process payment for another electronic commerce transaction, the payment request indicating the second handle, the merchant identifier or another merchant identifier, and additional transaction data; process the payment request to determine the user account associated with the second handle; transmit a confirmation request including at least a portion of the additional transaction data; authorize the user account of the electronic wallet application; receive another payment confirmation from the electronic wallet application to process payment using the second payment account; transmit another payment security token to the merchant server associated with the merchant identifier or another merchant server associated with the other merchant identifier, the other payment security token for the second payment account; and transmit an approval message for another payment confirmation notification.

In some embodiments, the first handle is active to process a single payment request, the payment server having non-transitory computer-readable storage medium with computer-executable instructions for causing the processor to de-activate the first handle after transmitting the payment security token.

In some embodiments, the payment server has non-transitory computer-readable storage medium with computer-executable instructions for causing the processor to determine an encryption key associated with the merchant server and encrypting the payment security token using the encryption key, the encrypted payment security for decryption by the merchant server using a corresponding key.

In some embodiments, the payment server has non-transitory computer-readable storage medium with computer-executable instructions for causing the processor to connect with a payment software development kit to: receive a mobile payment selection; prompt for the first handle at a form field; and transmit the first handle as part of the payment request.

In some embodiments, the payment server has non-transitory computer-readable storage medium with computer-executable instructions for causing the processor to process a registration request to associate the user account with the first handle by verifying uniqueness of the first handle by determining that the first handle is different than all handles of a repository of handles stored on or accessible by the payment server.

In some embodiments, the payment server has non-transitory computer-readable storage medium with computer-executable instructions for causing the processor to process a registration request to associate the user account with the first handle comprises determining that the first handle is at least a minimum size.

In some embodiments, the payment server has non-transitory computer-readable storage medium with computer-executable instructions for causing the processor to generate or identify a unique handle for the first handle, the unique handle being different than all active handles of a repository of handles stored on or accessible by the payment server.

In some embodiments, the payment server has non-transitory computer-readable storage medium with computer-executable instructions for causing the processor to generate or identify a time sensitive handle for the first handle, the time sensitive handle being active for the electronic commerce transaction only for a defined period of time.

In some embodiments, the transaction data comprises user data, the payment server having non-transitory computer-readable storage medium with computer-executable instructions for causing the processor to process the payment request to determine the user account associated with the first handle comprises determining that the user data matches stored data for the user account.

In some embodiments, the payment server has non-transitory computer-readable storage medium with computer-executable instructions for causing the processor to process a registration request to associate the first handle with the mobile device and the electronic mobile wallet, and process the payment request to determine the user account associated with the first handle by: determining the mobile device associated with the first handle, the mobile device being associated with the electronic wallet application.

In some embodiments, the payment server has non-transitory computer-readable storage medium with computer-executable instructions for causing the processor to authorize the user account of the electronic wallet application, and receive the payment confirmation from the electronic wallet application comprise receiving a valid login to the electronic wallet application.

In some embodiments, the payment server has non-transitory computer-readable storage medium with computer-executable instructions for causing the processor to transmit a transaction status update for display on the merchant website to indicate that the transaction is still pending until receipt of the payment confirmation.

In accordance with an aspect, there is provided a method of processing payment for a transaction using an electronic wallet application on or accessible by a mobile device. The method involves, at a payment server, receiving a payment request to process payment for an electronic commerce transaction at a merchant website, the payment request indicating a first handle, a merchant identifier and transaction data; processing the payment request to determine the user account associated with the first handle, the user account identifying the electronic wallet application; transmitting a confirmation request to the electronic wallet application, the confirmation request including at least a portion of the transaction data; receiving a payment confirmation from the electronic wallet application; transmitting a payment security token to a merchant server associated with the merchant website; and transmitting an approval message to update the merchant website with payment confirmation notification.

In some embodiments, the method involves processing a registration request to associate the user account with the first handle for processing payment using the electronic wallet application.

In some embodiments, the method involves processing the registration request to associate the user account with the first handle for processing payment using the electronic wallet application comprises: receiving a first payment account, the first handle for processing payment using the first payment account.

In some embodiments, the method involves, at the payment server, processing a second registration request to associate the user account with a second handle for processing payment using a second payment account; receiving a second payment request to process payment for another electronic commerce transaction, the payment request indicating the second handle, the merchant identifier or another merchant identifier, and additional transaction data; processing the payment request to determine the user account associated with the second handle; transmitting a confirmation request including at least a portion of the additional transaction data; authorizing the user account of the electronic wallet application; receiving another payment confirmation from the electronic wallet application to process payment using the second payment account; transmitting another payment security token to the merchant server associated with the merchant identifier or another merchant server associated with the other merchant identifier, the other payment security token for the second payment account; and transmitting an approval message for another payment confirmation notification.

In some embodiments, the first handle is active to process a single payment request, wherein the method comprises de-activating the first handle after transmitting the payment security token.

In some embodiments, the method involves determining an encryption key associated with the merchant server and encrypting the payment security token using the encryption key, the encrypted payment security for decryption by the merchant server using a corresponding key.

In some embodiments, the method involves, at a payment software development kit, receiving a mobile payment selection; prompting for the first handle at a form field; and transmitting the first handle as part of the payment request.

In some embodiments, the method involves processing a registration request to associate the user account with the first handle comprises: verifying uniqueness of the first handle by determining that the first handle is different than all handles of a repository of handles stored on or accessible by the payment server.

In some embodiments, the method involves processing a registration request to associate the user account with the first handle comprises determining that the first handle is at least a minimum size.

In some embodiments, the method involves generating or identifying a unique handle for the first handle, the unique handle being different than all active handles of a repository of handles stored on or accessible by the payment server.

In some embodiments, the method involves generating or identifying a time sensitive handle for the first handle, the time sensitive handle being active for the electronic commerce transaction only for a defined period of time.

In some embodiments, the transaction data comprises user data, wherein processing the payment request to determine the user account associated with the first handle comprises determining that the user data matches stored data for the user account.

In some embodiments, the method involves processing the registration request to associate the first handle with the mobile device and the electronic mobile wallet, wherein processing the payment request to determine the user account associated with the first handle comprises: determining the mobile device associated with the first handle, the mobile device being associated with the electronic wallet application.

In some embodiments, the method involves authorizing the user account of the electronic wallet application, and receiving the payment confirmation from the electronic wallet application comprise receiving a valid login to the electronic wallet application.

In some embodiments, the method involves transmitting a transaction status update for display on the merchant website to indicate that the transaction is still pending until receipt of the payment confirmation.

In some embodiments, the method involves displaying a request for payment confirmation including the portion of the transaction data or the reference to the request package; receiving a transaction approval to the request for payment confirmation; and transmitting the transaction approval to the payment server.

In accordance with an aspect, there is provided a method of processing payment for a transaction at an electronic wallet application on or accessible by a mobile device, the method comprising: at the mobile device, authorizing a user account of the electronic wallet application on or accessible by the mobile device; receiving a first handle associated with the user account; receiving a confirmation request at the electronic wallet application, the confirmation request for a payment request to process payment for an electronic commerce transaction at a merchant website, the payment request indicating a first handle, a merchant identifier, and transaction data; authorizing the user account of the electronic wallet application; transmitting a payment confirmation to authorise the payment request to trigger transmission of a payment security token to a merchant server associated with the merchant website; and displaying an transaction message for the payment confirmation.

In some embodiments, the method involves transmitting a registration request to associate the user account with the first handle for processing payment using the electronic wallet application.

In some embodiments, the method involves processing the registration request to associate the user account with the first handle for processing payment using the electronic wallet application comprises: receiving a first payment account, the first handle for processing payment using the first payment account.

In some embodiments, the method involves, at the mobile device, authorizing the user account of the electronic wallet application on or accessible by the mobile device; transmitting a second registration request to associate the user account with a second handle for processing payment using a second payment account; receiving a confirmation request for a second payment request to process payment for another electronic commerce transaction, the payment request indicating the second handle, the merchant identifier or another merchant identifier, and additional transaction data; authorizing the user account of the electronic wallet application; transmitting another payment confirmation from the electronic wallet application to process payment using the second payment account to trigger transmission of another payment security token to the merchant server associated with the merchant identifier or another merchant server associated with the other merchant identifier, the other payment security token for the second payment account; and transmitting an approval message for another payment confirmation notification.

In some embodiments, the first handle is active to process a single payment request and is de-activated after transmitting the payment security token.

In some embodiments, the method involves transmitting a registration request to associate the user account with the first handle comprises: verifying uniqueness of the first handle by determining that the first handle is different than all handles of a repository of handles stored on or accessible by the payment server.

In some embodiments, the method involves transmitting a registration request to associate the user account with the first handle comprises determining that the first handle is at least a minimum size.

In some embodiments, the method involves generating or identifying a unique handle for the first handle, the unique handle being different than all active handles of a repository of handles.

In some embodiments, the method involves generating or identifying a time sensitive handle for the first handle, the time sensitive handle being active for the electronic commerce transaction only for a defined period of time.

In some embodiments, the method involves transmitting a registration request to associate the first handle with the mobile device and the electronic mobile wallet.

In some embodiments, the method involves authorizing the user account of the electronic wallet application, and receiving the payment confirmation from the electronic wallet application comprise receiving a valid login to the electronic wallet application.

In some embodiments, the method involves transmitting a transaction status update for display on the merchant website to indicate that the transaction is still pending until receipt of the payment confirmation.

In accordance with an aspect, there is provided a method of processing payment for a transaction using an electronic wallet application on or accessible by a mobile device. The method involves, at a payment server, receiving a payment request to process payment for an electronic commerce transaction from a merchant website, the payment request indicating a user account identifier, a merchant identifier and transaction data; processing the payment request to determine the user account associated with the user account identifier, the user account identifying the electronic wallet application; transmitting a confirmation request to the electronic wallet application, the confirmation request including at least a portion of the transaction data; receiving a payment confirmation from the electronic wallet application; and transmitting a payment package to a merchant server associated with the merchant website.

In some embodiments, the user account identifier is a unique handle.

In some embodiments, the user account identifier is payment code.

In some embodiments, the payment package is a payment security token.

In accordance with an aspect, there is provided a system of processing payment for a transaction at an electronic wallet application on or accessible by a mobile device. The system has the electronic wallet application having non-transitory computer-readable storage medium with computer-executable instructions for causing a processor of the mobile device to: authorize a user account of the electronic wallet application; trigger the display of a confirmation request on a display of the mobile device; provide a payment confirmation. The system has a payment server having non-transitory computer-readable storage medium with computer-executable instructions for causing a processor of the payment server to: associate the user account with a user account identifier for processing payment using the electronic wallet application; receive a payment request to process payment for an electronic commerce transaction at a merchant website, the payment request indicating the user account identifier, a merchant identifier and transaction data; transmit the confirmation request to the electronic wallet application, the confirmation request including at least a portion of the transaction data; receive the payment confirmation from the electronic wallet application; transmit, over a secured channel, a payment package to a merchant server associated with the merchant website; and transmit an approval message to update the merchant website with payment confirmation notification.

In some embodiments, the user account identifier is a unique handle.

In some embodiments, the user account identifier is payment code.

In some embodiments, the payment package is a payment security token.

In accordance with an aspect, there is provided a method of processing payment for a transaction at an electronic wallet application on or accessible by a mobile device. The method involves: authorizing a user account of the electronic wallet application; receiving a code, the code comprising a reference to a request package, the request package indicating transaction data, a customer account identifier, and a merchant identifier; transmitting the reference to a payment server; receiving a portion of the transaction data; displaying a request for payment confirmation including the portion of the transaction data; receiving a transaction approval to the request for payment confirmation; and transmitting the transaction approval to the payment server.

In some embodiments, the method can involve receiving link approval to create a link between an electronic wallet application identifier for the user account and the customer account identifier for subsequent transactions; and transmitting the link approval and the wallet application identifier.

In some embodiments, the method can involve receiving notification of an additional transaction request and additional transaction data, the additional transaction involving the customer account identifier and the merchant identifier; displaying an additional purchase request including the additional transaction data; receiving an additional transaction approval to process payment; and transmitting the transaction approval to the payment server.

In some embodiments, the method can involve verifying that the request package is linked to the merchant identifier.

In some embodiments, the request package is encrypted using a first key linked to the merchant and wherein the verifying comprises using a second key linked to the merchant to decrypt the request package.

In some embodiments, the code comprises machine readable data as the reference to the request package. In some embodiments, the code is encrypted by a key linked to the merchant.

In some embodiments, the transaction approval comprises a selected payment type.

In some embodiments, the code is temporary and valid for a limited use.

In accordance with an aspect, there is provided a system of processing payment for a transaction at an electronic wallet application on or accessible by a mobile device. The system has the electronic wallet application having non-transitory computer-readable storage medium with computer-executable instructions for causing a processor of the mobile device to: authorize a user account of the electronic wallet application; receive a code, the code comprising a reference to a request package, the request package indicating transaction data, a customer account identifier, and a merchant identifier; transmit the reference to the request package to the payment server; receive a portion of the transaction data; display a request for payment confirmation including the portion of the transaction data or the reference to the request package; receive a transaction approval to the request for payment confirmation; and transmitting the transaction approval. The system has the payment server having non-transitory computer-readable storage medium with computer-executable instructions for causing a processor of the payment server to: receive the reference to the request package; transmit the reference to a cloud service; receive the request package from the cloud service; transmit the portion of the transaction data from the request package or the reference to the request package; receive the transaction approval to the request for payment confirmation from the mobile device; and transmit a payment package to the cloud service, the payment package including the transaction approval, the customer account identifier, and the merchant identifier.

In some embodiments, the electronic wallet application having non-transitory computer-readable storage medium with computer-executable instructions for causing the processor of the mobile device to: receive link approval to create a link between an electronic wallet application identifier for the user account and the customer account identifier for subsequent transactions; and transmit the link approval and the wallet application identifier.

In some embodiments, the electronic wallet application has non-transitory computer-readable storage medium with computer-executable instructions for causing the processor of the mobile device to: receive notification of an additional transaction request and additional transaction data, the additional transaction involving the customer account identifier and the merchant identifier; display an additional purchase request including the additional transaction data; receive an additional transaction approval to process payment; and transmit the transaction approval to the payment server.

In some embodiments, the electronic wallet application has non-transitory computer-readable storage medium with computer-executable instructions for causing the processor of the mobile device to: verify that the request package is linked to the merchant identifier.

In some embodiments, the request package is encrypted using a first key linked to the merchant and wherein the electronic wallet application has non-transitory computer-readable storage medium with computer-executable instructions for causing the processor of the mobile device to verify using a second key linked to the merchant to decrypt the request package.

In some embodiments, the code comprises machine readable data as the reference to the request package.

In some embodiments, the code is encrypted by a key linked to the merchant.

In some embodiments, the transaction approval comprises a selected payment type.

In some embodiments, the code is temporary and valid for a limited use.

In some embodiments, receiving the transaction approval to the request for payment confirmation involves receiving a selected payment option from a plurality of payment options.

In some embodiments, the payment server has non-transitory computer-readable storage medium with computer-executable instructions for causing a processor of the payment server to: receive link approval to create a link between an electronic wallet application identifier and the customer account identifier for subsequent transactions; and create a link package with a link between the wallet application identifier and the customer account identifier.

In some embodiments, the payment server has non-transitory computer-readable storage medium with computer-executable instructions for causing a processor of the payment server to: receive notification of an additional transaction request and additional transaction data, the additional transaction involving the customer account identifier and the merchant identifier; receive an additional transaction approval to process payment for the additional transaction; and transmit an additional payment package to the cloud service, the payment package including the additional transaction approval, the customer account identifier, and the merchant identifier.

In some embodiments, receiving the transaction approval to the request for payment confirmation comprises receiving a selected payment option from a plurality of payment options.

In accordance with an aspect, there is provided a method of processing payment for a transaction at a server interacting with an electronic wallet application on or accessible by a mobile device. The method involves receiving a reference to a request package from the mobile device, the request package indicating transaction data, a customer account identifier, and a merchant identifier; transmitting the reference to a cloud service; receiving the request package from the cloud service; transmitting a portion of the transaction data from the request package; receiving a transaction approval to a request for payment confirmation from the mobile device; and transmitting a payment package to the cloud service, the payment package including the transaction approval, the customer account identifier, and the merchant identifier.

In some embodiments, the method can involve receiving link approval to create a link between an electronic wallet application identifier and the customer account identifier for subsequent transactions; and creating a link package with a link between the wallet application identifier and the customer account identifier.

In some embodiments, the method can involve receiving notification of an additional transaction request and additional transaction data, the additional transaction involving the customer account identifier and the merchant identifier; receiving an additional transaction approval to process payment for the additional transaction; and transmitting an additional payment package to the cloud service, the payment package including the additional transaction approval, the customer account identifier, and the merchant identifier.

In accordance with an aspect, there is provided a payment server having: a communication interface; and at least one processor configured to: receive a reference to a request package from the mobile device, the request package indicating transaction data, a customer account identifier, and a merchant identifier; transmit the reference to a cloud service; receive the request package from the cloud service; transmit a portion of the transaction data from the request package; receive a transaction approval to a request for payment confirmation from the mobile device; and transmit a payment package to the cloud service, the payment package including the transaction approval, the customer account identifier, and the merchant identifier.

In accordance with an aspect, there is provided a mobile device having: a communication interface; and at least one processor configured to: authorize a user and a payment option; receive a code, the code comprising a reference to a request package, the request package indicating transaction data, a customer account identifier, and a merchant identifier; transmit the reference to a payment server; receive a portion of the transaction data; display a request for payment confirmation including the portion of the transaction data; receive a transaction approval to the request for payment confirmation; and transmit the transaction approval to the payment server.

In accordance with an aspect, there are provided systems, devices and processes for electronic commerce (e-commerce) payment processing using a handle and a mobile device with a mobile wallet application installed thereon. The handle may be used at a merchant website to process the electronic commerce payment for instead of providing payment information and/or personally identifiable information. That is, the handle may not include payment information and/or personally identifiable information.

In accordance with an aspect, there is provided a payment server having a communication interface; and at least one processor configured to: receive an electronic message from a software development kit at a merchant website including a first handle, the handle to process payment for an electronic commerce transaction, the handle linked to a mobile device; determine the mobile device linked to the handle; transmit a request for confirmation of payment notification including summary data for the electronic commerce transaction; receive an authorization notification in response to the request; and transmit a payment security token to a merchant server linked to the merchant website.

In accordance with an aspect, there is provided a mobile device having a communication interface; and at least one processor configured to: transmit an electronic message including a first handle linked to the mobile device, the handle to process payment for an electronic commerce transaction; receive, from a server, a payment notification including summary data for the electronic commerce transaction; verifying log in credentials in response to an authorization request; display a request for confirmation of the payment notification; and send, to the server, the confirmation of the payment notification.

In accordance with an aspect, there is provided a mobile device having a communication interface; and at least one processor configured to: receive a user configured first handle and link the first handle to the mobile device; receive, from a server, a payment notification including summary data for the electronic commerce transaction; verifying log in credentials in response to an authorization request; display a request for confirmation of the payment notification; and send, to the server, the confirmation of the payment notification.

In accordance with an aspect, there is provided a mobile device having a communication interface; and at least one processor configured to: transmit an electronic message including a first handle linked to the mobile device, the handle to process payment for an electronic commerce transaction, the first handle generated automatically and having an active time period; receive, from a server, a payment notification including summary data for the electronic commerce transaction; verifying log in credentials in response to an authorization request; verifying the active time period of the first handle; display a request for confirmation of the payment notification; and send, to the server, the confirmation of the payment notification.

Many further features and combinations thereof concerning embodiments described herein will appear to those skilled in the art following a reading of the instant disclosure.

DESCRIPTION OF THE FIGURES

Embodiments will now be described, by way of example only, with reference to the attached figures, wherein in the figures:

FIG. 10 is a screenshot of an interface of a system for transactions using mobile devices according to some embodiments.

FIG. 22 is a screenshot of an interface of a system for transactions according to some embodiments.

FIG. 25 is a screenshot of an interface of a mobile device of a system for transactions according to some embodiments.

FIG. 31 is a flowchart of a method for transactions according to some embodiments.

FIG. 32 is a flowchart of a method for transactions according to some embodiments.

DETAILED DESCRIPTION

Embodiments described herein provide a system that enables transactions using mobile devices to benefit from increased security. The transactions can be in-store transactions or e-commerce transactions, for example. The transaction can be referred to as electronic transactions as they involve electronic devices, such as a mobile devices, secure channels and servers, for example.

Figure 1A:
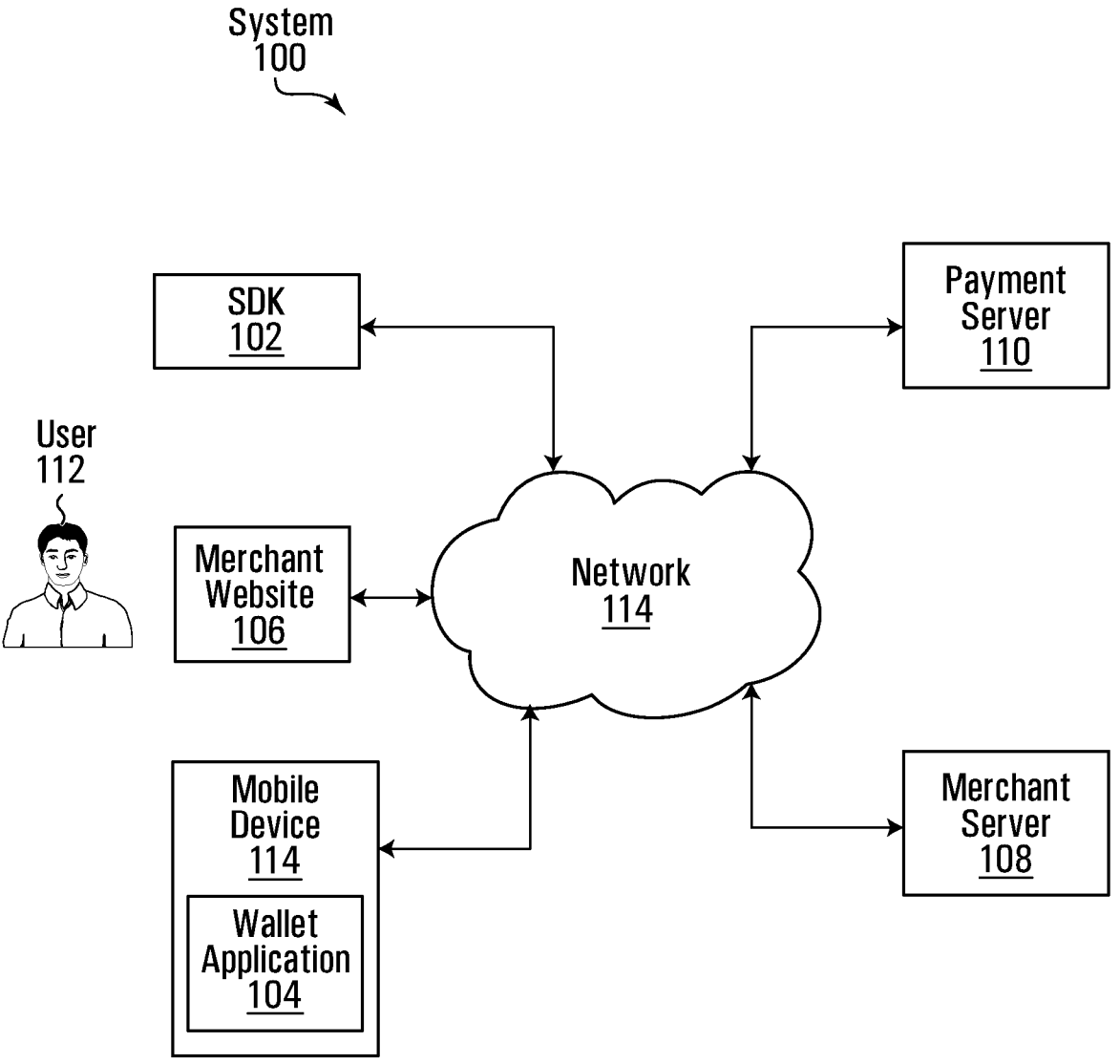
FIG. 1A is a diagram of an example system for e-commerce transactions using mobile devices.

FIG. 1A is a diagram of an example system 100 for e-commerce transactions using mobile devices. The system 100 includes a payment server 110, and mobile (or electronic) wallet application 104 residing on a mobile device 114. In some embodiments, the system 100 includes a merchant website 106 for access by a consumer 112 for e-commerce transactions. The merchant website 106 is associated with a merchant server 108 to process payments for the e-commerce transaction. The payment server 110 and the mobile wallet application 104 can include logic or programming code to automatically trigger control actions. Components of the system 100 can be coupled using one or more networks 114. The network 114 (or multiple networks) is capable of carrying data. The network 114 can involve wired connections, wireless connections, or a combination thereof. In some embodiments, components of the system 100 can exchange data by way of a cloud service.

In some embodiments, the system 100 enables transaction and payment processing using mobile devices 114 to benefit from increased security. In some embodiments, the system 100 enables transactions using a user (or customer) account identifier, such as machine readable handle or payment code. In some embodiments, the system 100 enables transactions using a payment code readable by wallet application 104.

The payment code can include a reference to a request package or payment request that includes data about a transaction. For example, the request package can include transaction data, a customer account identifier, and a merchant identifier. The customer account identifier may be received by a merchant website 106, for example. The system 100 can link the customer account identifier to a wallet application identifier for a wallet application 104 of mobile device 114 to streamline payment process for subsequent transactions.

In some embodiments, the system 100 enables transactions using a handle. In some embodiments, the system 100 enables e-commerce transactions using a unique name (as an example handle) to be inserted in an e-commerce checkout web page (e.g. in a credit card number field) of a merchant website 106, which triggers control commands to a financial institution system to route a payment confirmation message to a registered mobile device. In some embodiments, the unique name or handle can be input into a merchant device at point-of-sale in a merchant location.

In some embodiments, the system 100 enables transactions using a mobile device 114 with a payment or electronic wallet application 104 to provide increased security. To process payment for the transaction, an interface of a merchant website 106 can display an option to "pay with secure mobile system". This may involve an interface with a modified checkout web page at a merchant website 106 that includes a user account identifier, such as a payment code (e.g. QR code), for example. Instead of providing or indicating any payment information at the checkout web page of a merchant website 106, the customer can use the user account identifier (such as the payment code, for example) to process the transaction using a mobile device 114. The user account identifier functions to link or associate a payment account with a specific transaction such that the payment account is used to provide payment from a customer to a merchant for the transaction. The payment account may indicate sensitive financial data that may trigger security issues if it is provided at the merchant website. The user account identifier may not indicate sensitive financial data such that it can be provided at the merchant website (e.g. entered in a form field or displayed for capture) without triggering the same security issues as the payment account. The backend payment server 110 can link or associate the user account identifier with the payment account in order to process payment from the customer to the merchant. For example, malicious software may monitor or merchant website 106 in order to capture information entered or displayed on the merchant website 106. In such a case the malicious software can only capture the user account identifier which may not be sufficient to process unauthorized transactions without requiring additional actions or information. The user account identifier can contain information about the requested transaction and can be encrypted using a key for the merchant, for example. The customer payment card information is not exposed to the merchant, and the merchant does not have to store it. Further, the user does not have to provide any payment information on a merchant's website 106.

For example, the user account identifier can be a unique handle that a customer can input into the merchant website at a form field. As another example, user account identifier can be a payment code that can be displayed at the merchant website. For example, the customer can then take an image of a QR code displayed on the webpage with the customer's mobile device 114 having a camera and a wallet application 104. The customer can securely access the wallet application 104 on the mobile device 114 using an authentication process (e.g. by logging-in to application, providing a fingerprint and/or other biometric associated with the login). The QR code can contain information about the requested transaction which can be encrypted using a key for the merchant, for example. The mobile application 114 can decrypt or decode the data in the code. A message with a confirmation request can be displayed at the mobile device 114 to confirm the purchase and select a method of payment (e.g. credit card, bank card, value card). Upon confirming the selection, the mobile device 114 sends data to the associated financial institution payment server 110 in the form of tokenized data representing the selected payment method. The financial institution payment server 110 routes any necessary data to a merchant server 108 to process payment. The customer payment card information is not exposed to the merchant, and the merchant does not have to store it. Further, the user does not have to provide any payment information on a merchant's website 106.

In some embodiments, the system includes a software development kit (SDK) 102. The merchant website 106 is configured using the SDK 102 to provide a payment option, such as "pay with secure system", and upon selection triggers secure payment workflows according to embodiments described herein. Accordingly, the SDK 102 can be used to modify the merchant website 106 to indicate the payment option and trigger payment workflow with mobile device 114. For example, the SDK 102 can configure the merchant website 106 to display a code as part of the payment workflow. As another example, the SDK 102 can configure the merchant website 106 to display a field to receive a handle or code as part of the payment workflow.

For example, selection of the secure payment option can request or prompt the consumer 112 to enter an identifier code or handle at the merchant website 106. In some embodiments, the consumer 112 previously registers the handle using the mobile wallet application 104 residing on a mobile device 114, for example. The wallet application 104 and server 110 exchange data communications to link or associate the handle with a mobile device 114 that has the mobile wallet application 104 installed thereon. For example a user account profile may store data relating to one or more handles, one or more payment accounts, one or more electronic wallet applications 104, one or more mobile devices 114, transaction history data, and other information about the user. The payment server 110 can store multiple user account profiles in a repository that can be accessed in order to determine the mobile wallet application 104 associated with a particular handle.

Upon receiving the handle, the merchant website 106 sends the handle to the payment server 110, which looks up the associated mobile device 114 (and the mobile wallet application 104) using the repository of user account profiles. The payment server 110 sends a push notification to the mobile device 114 (and the mobile wallet application 104), the notification indicating that a request for a payment transaction was received from the merchant website 106. The notification may contain information about the transaction (e.g. purchase summary) and redirect the notification to the mobile wallet application 104. In some embodiments, the notification may prompt or encourage the consumer 112 to launch the mobile wallet application 104 to display further information about the requested transaction. In some embodiments, the notification can include code to automatically launch the mobile wallet application 104. Information about the transaction could be automatically requested by the mobile wallet application 104 in secure communication with the payment server 110, or the information about the requested transaction may be pushed to the wallet application 104 upon opening it.

The consumer 112 may be asked to confirm the payment request through the mobile wallet application 104 by a variety of methods. The mobile device 114 and the electronic wallet application 104 can authorize the user linked to the user account. Example authentication methods include entering a password, fingerprint or other biometric data, or by authenticating using a previously provisioned secure token stored on the mobile device 114, for example.

Handles may be made of a variety of characters or symbols, and be of different lengths. There may be a minimum length in some embodiments. The handle can be generated or configured by the consumer 112. When generated by the consumer 112, the system 100 can verify the handle and its uniqueness against a repository of assigned handles. The handle can also be generated by the mobile wallet application 104 or server 110. In the case of temporary handles, the system 100 may generate an available handle that is not presently active, such as a numerical string of limited length (e.g. 6 digits), to allow for ease of entry into the respective checkout form field by the consumer 112.

The consumer 112 may register a different handle for each mobile device 114 the user wishes to use for e-commerce. The consumer 112 may register a different handle for different payment accounts or products in the mobile wallet application 104. The consumer 112 may also assign temporary handles in some embodiments. Instead of permanently registering a mobile device 114 with the system 100, the consumer 112 may temporarily assign a handle to the mobile device 114, through the mobile wallet application 104, for example, in advance of a transaction. The handle may be for a single or limited number of uses, or limited to a particular time period. That is the handle may be a temporary handle. Accordingly, the user account profile can link a first handle with a first payment account and can link a second handle with a second payment account. The user can provide the first handle a merchant website 106 to process payment with the first payment account. The user can provide the second handle to the merchant website 106 to process payment with the second payment account. In this way the user has flexible options for payment in a secured manner.

Prior to sending the request to the mobile device 114 of the consumer 112, the payment server 110 may verify that information related to the consumer 112 provided to the merchant website 106 matches stored information associated with the handle. For example the consumer 112 may also provide their date of birth along with the handle. The user account profile can store the date of birth and the handle. The payment server 110 can verify the received date of birth and the received handle by way of a comparison to the data in the user account profile.

In some embodiments, the consumer 112 may only provide the handle to the merchant website 106 instead of any payment card information and/or personally identifiable information. This may enhance security as payment information is not received at the merchant website 106. When approving the transaction through the mobile wallet application 104, the consumer 112 can select a method of payment through the mobile wallet application 104 to pay for the transaction, thereby allowing non-traditional methods of payment supported by the mobile wallet application 104, but not typically supported by merchants. This also limits the sharing of payment information with the merchant website 106. As noted, different handles may be associated with different payment accounts as another option to use different payment accounts.

As another example, selection of the secure payment option can prompt the display of a code at the merchant website 106. The code may be another example of the user account identifier in that the code is linked to a user account profile. In some embodiments, the consumer 112 can process the transaction using the mobile device 114 by capturing the code at the merchant website 106 instead of providing any payment card information and/or personally identifiable information to the merchant website 106. This may enhance security as payment information is not received at the merchant website 106. When approving the transaction through the mobile wallet application 104, the consumer 112 can select a method of payment through the mobile wallet application 104 to pay for the transaction, thereby allowing non-traditional methods of payment supported by the mobile wallet application 104, but not typically supported by merchants. This limits the sharing of payment information with the merchant website 106 and provides flexible payment options.

In some embodiments, the payment approval may require more time to process, such as when a non-standard method of payment is selected or the mobile device 114 is not readily accessible, for example. The server 110 can be configured to communicate to the merchant website 106 that the transaction is still pending. The merchant website 106 may then present a suitable page to the user saying that the transaction request was received and that the user will be notified when the transaction is approved. In the event that further confirmations or modifications are required to the payment method, a component of the system 100 may send a suitable notification to the mobile device 114 to open the wallet application 104. The notification may request such further user action as is necessary through the wallet application 104. For example, the request may prompt for input or capture of the code displayed on the merchant website 106. A traditional e-commerce transaction might timeout waiting for payment approval, but the system 100 can provide for asynchronous payment approvals.

In some embodiments, there may be multiple payment transaction requests pending for approval or confirmation by consumer 112. Where multiple payment transaction requests are pending, the transaction requests may be displayed in a list or one after another in the mobile wallet application 104, to be viewed prior to approving any of them. Each transaction request may be associated with a different code displayed on different merchant websites 106. In some embodiments, a link between an electronic wallet application identifier for the user account and the customer account identifier for subsequent transactions can remove the requirement of scanning or capturing the code and the transaction request can be automatically triggered by selecting the option to pay with the system 100.

As noted, in some embodiments, the system 100 enables transactions using a code that links the wallet application 104 and the mobile device 114 to the merchant server 106. The payment server 110 can register a merchant server 108 to provide an encryption key, which may be assigned by a financial institution system, for example. To process payment for the transaction, the merchant website 106 can provide an option to "pay with secure system". This may present a modified checkout page at the merchant website 106 with a displayed code (e.g. QR code), for example. The code can link the merchant server 108 to the wallet application 104. Instead of providing any payment information on the merchant website 106, the consumer 112 can use the code to process the transaction. For example, the consumer 112 can then take an image or photo of a QR code displayed on the website 106 with a camera of the mobile device 114. The consumer 112 can securely access the application 104 on the mobile device 114 (e.g. by logging-in to application or providing a fingerprint or other biometric associated with the login) to add another level of security.

The code can contain information about the requested transaction and can be encrypted using a merchant key generated with the financial institution during the registration process, for example. The mobile application 104 can decrypt the data in the code. A message with a confirmation request can be displayed in the mobile application 104 so that the consumer 112 can confirm the purchase, and then select a method of payment within the mobile application 104 (e.g. credit card, bank card, value card). Upon confirming the selection, the mobile device 114 sends data to the associated financial institution servers in the form of tokenized data representing the selected payment method. The financial institution routes any necessary data to a merchant server to process payment. The merchant website receives a confirmation that payment was received. In this way, the payment card information is not exposed to the merchant (e.g. merchant website 106, merchant server 106), and the merchant does not have to store it. Further, the consumer 112 does not have to provide any payment information on a merchant's website 106.

In some embodiments, instead of a QR code displayed on the merchant website 106, there may be a field for the consumer 112 to enter identification details, such as a phone number or handle, on the merchant website 106 to indicate an electronic address to send the payment confirmation request. The merchant server 106 can send a text message to that phone number with the same encrypted data that would have been in the QR code, for example. The wallet application 104 can be configured to listen for such text messages formatted in a specific way (e.g. using the key generated and exchanged during registration of the merchant) and automatically bring up the confirmation screen in the application. This is another example of an account identifier that can trigger payment processing using the mobile device 114.

In some embodiments, the e-commerce checkout can be performed as part of the merchant website 106 which can also refer to a merchant application on the same mobile device 114 as the wallet application 104. The confirmation for payment can also be performed on the same mobile device 114. The merchant website 106 can present the encrypted data in the merchant website 106 in a format that would be directly readable or routable to the wallet application 104. For example, the encrypted data can be a formatted string or QR code with a button to send locally to the wallet application 104.

Optionally, the consumer 112 can choose to link the customer's tokenized payment information with the merchant server 108. In this way, the token could be stored by the merchant server 108 for use multiple times, without the consumer 112 having to re-confirm on the mobile device 114. In some embodiments, an identifier for the mobile device 114 may be stored by the merchant server 106 for later use. During a future transaction, only confirmation and payment information from that identified mobile device 114 can be accepted by the merchant website 106 and merchant server 108 for checkouts involving the account of the consumer 112. Changing the link can require routing a confirmation to that mobile device 114 as well. In the event of a lost or broken mobile device 114 after linking, the consumer 112 can contact the payment server 110 to purge or delete all of the links of the consumer 112 associated with merchants.

In some embodiments, if no link is stored between merchant server 106 and mobile device 114, then it may be possible for any device and tokenized payment method represented on the mobile wallet 104 on that device 114 to be used to confirm and make the payment.

Figure 1B:
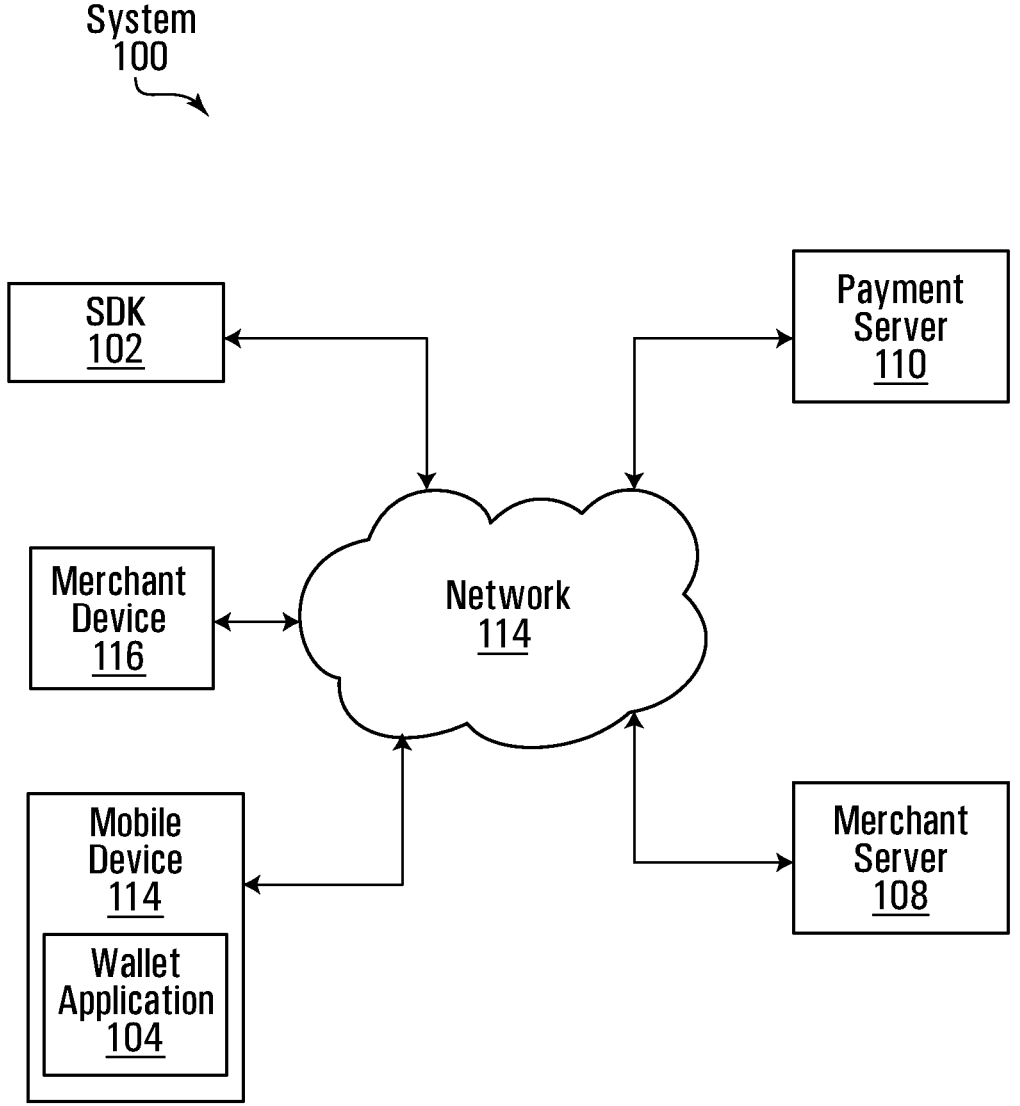
FIG. 1B is a diagram of an example system for transactions using mobile devices.

FIG. 1B shows an example system 100 with a merchant device 116. The system 100 can assist with "in-person" transactions at a merchant's physical store, for example. The merchant store has a merchant device 116 to connect with a mobile device 114 to process the transaction. The merchant device 116 can use near field communication (NFC) or Bluetooth technology to exchange data (including the code) with the wallet application 104, for example. The merchant device 116 can connect with the merchant server 108 to implement the workflows described herein with reference to the merchant website 106, for example. Accordingly, the system 100 is not limited to e-commerce transactions and be used to process in store transactions in some embodiments. Further details relating to in store transactions are provided herein in relation to FIG. 9, for example. In some examples, the merchant device 116 is operable to display a form field in order to receive a handle from the customer in the store. Accordingly both the handle and the QR code can trigger payment processing in the mobile device 114 in the store.

Figure 2:
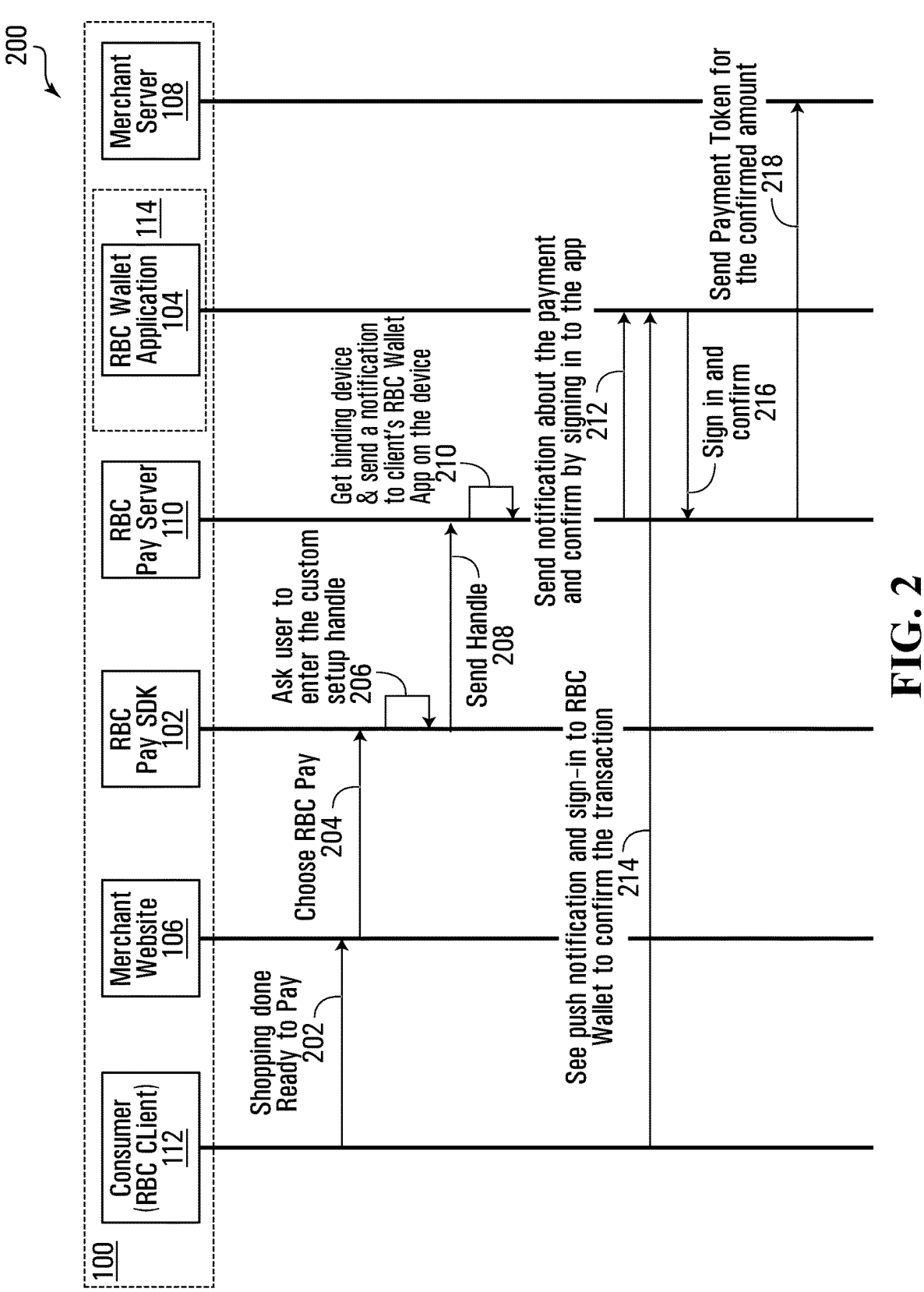
FIG. 2 is a diagram of an example workflow of a system for e-commerce transactions using mobile devices.

FIG. 2 shows an example of a system 100 and workflow 200 for e-commerce transactions using mobile devices. In some embodiments, the system 100 uses a handle selected or configured by a consumer 112 for the e-commerce transaction at the merchant website 106. The consumer 112 uses the mobile device 114 to access the merchant website 106 to shop and, after they are done shopping 202, trigger an e-commerce transaction check out process. The check-out process may include an interface with form fields for receiving information to process the payment transaction for e-commerce. The consumer 112 uses the mobile device 114 or another computing device to send control commands using SDK 102 to select a mobile payment transaction 204 option from a list of payment options in the interface with form fields.

The consumer 112 creates an account with a payment server 110 to configure a user handle linked to a mobile device 114 and wallet application 104. The payment server one 110 stores the user handle, an identifier for mobile device 114, and an identifier for the wallet application 104 in the user account profile. As noted, the payment server 110 stores the user account profiles in a repository in order to determine the user account associated with a handle received from merchant website 106. When a selected mobile payment transaction 204 option is detected, the server 110 transmits 206 control commands to prompt for the custom user handle. The SDK 102 transmits 208 control commands for input data at a form field in the interface in response to the prompt for the custom user handle. The server 110 receives the input data for the handle. The server 110 confirms the user handle and determines 210 the corresponding mobile device 114 and wallet application 104 (e.g. linked to the handle during the registration process) using the repository of user account profiles. As noted, the user account profile includes an identifier for the mobile device 114 and an identifier for the wallet application 104 in order to transmit a confirmation request for display on the mobile device 114. That is, the identifier for the mobile device 114 and the identifier for the wallet application 104 indicate an address or pointer for transmission of the confirmation request. The server 110 transmits 212 a notification to the mobile device 114 and wallet application 104 with payment details and requests confirmation by displaying a confirmation request on a display of the mobile device 114. The mobile device 114 and wallet application 104 transmits a confirmation message 216 to the server 110 to confirm the mobile payment transaction. The consumer 112 responds 214 to the notification to confirm the transaction at mobile device 114 and wallet application 104 by signing into their profile using the mobile wallet application 104, for example. The wallet application 104 is operable to register and authenticate the consumer 112 (using a login, unique identifier, and password for example) prior to providing access to payment services and profile information, including the handle. The mobile device 114 or wallet application 104 may serve one user or multiple consumers 112. At 218, the payment server 110 sends a secured payment token for the confirmed payment amount with other payment data to a merchant server 108 to complete the e-commerce mobile payment transaction.

The consumer 112 downloads or installs the mobile wallet application 104 to their mobile device 114. The consumer 112 uses the mobile wallet application 104 for registration of the payment checkout service to configure a customer profile. The consumer 112 can use the mobile wallet application 104 to select a unique handle, which will be associated to their customer profile and devices 114. The mobile wallet application 104 can connect to the payment server 110 for the registration process. The mobile wallet application 104 can provide its identifier along with the unique handle during the registration process in order to link its identifier and the unique handle to the customer account profile. When the consumer 112 visits a merchant browser website 106 with the SDK 102 checkout service, the customer 112 can be prompted to enter the selected unique handle at the time of payment. The data entry can send a notification to the mobile device 114 linked to the consumer 112 profile. When the consumer 112 is authenticated they can review the name of the merchant and the payment amount for the transaction as part of a notification or message, and select their funding account/product. In some embodiments, the payment account is linked to the unique handle at the customer account profile. In other embodiments, the customer can select a payment account at the time of providing confirmation of purchase and the handle can be linked to the customer account generally. A payment token is sent to a merchant server 108 to process payment for the transaction. The consumer 112 can view the confirmed payment on the merchant browser 106. That is, the merchant website 106 can display the confirmed payment.

Figure 3:
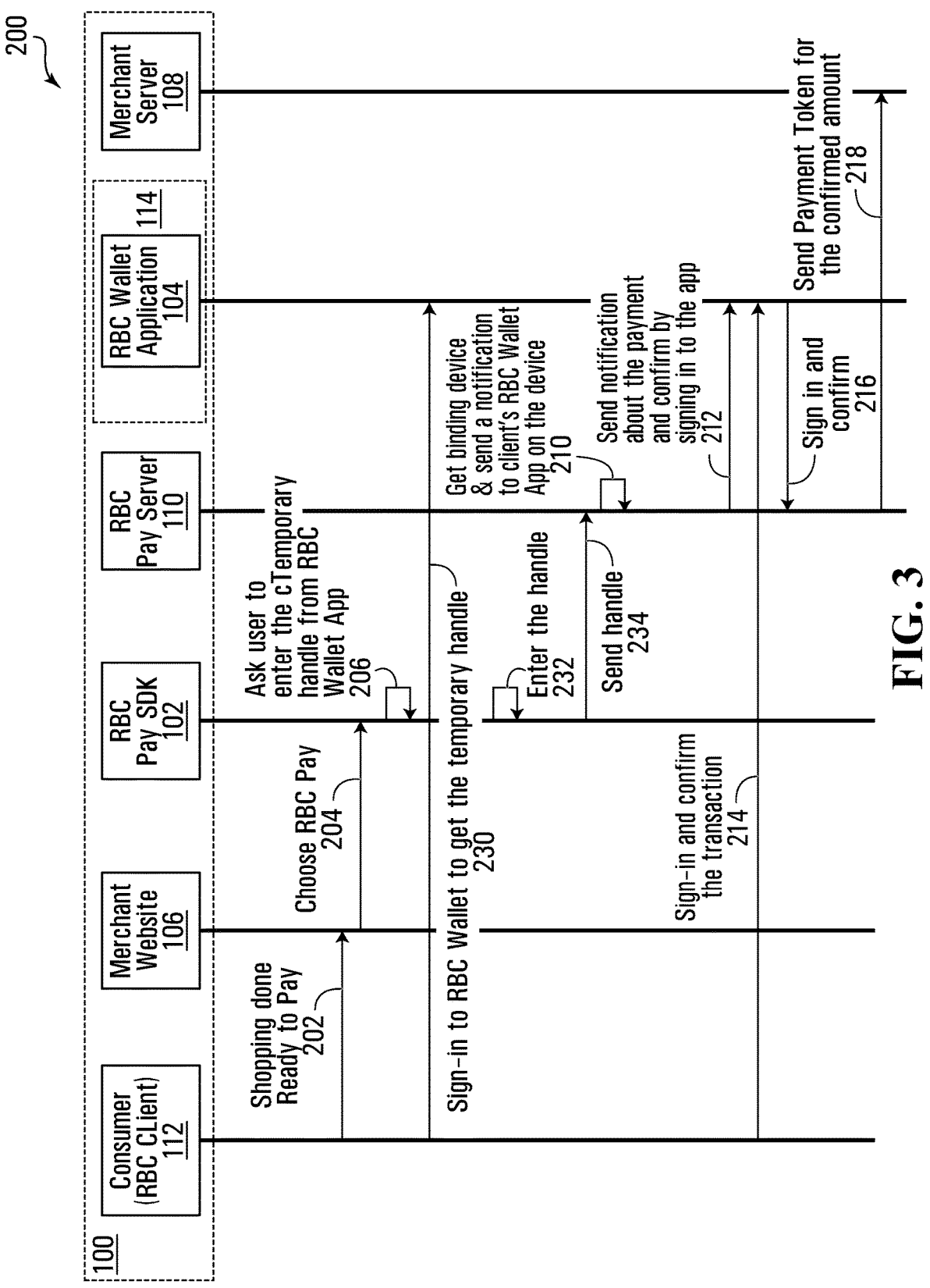
FIG. 3 is a diagram of another example workflow of a system for e-commerce transactions using mobile devices.

FIG. 3 shows an example of a system 100 and workflow 300 for e-commerce transactions using mobile devices 114. In some embodiments, the system 100 uses a unique time sensitive handle for the e-commerce transaction at the merchant website 106. The unique time sensitive handle can be generated by the wallet application 104 or server 110 in some embodiments. The unique time sensitive handle is linked to the user account in the user account profile. The consumer 112 uses a mobile device 114 to access the merchant website 106 for e-commerce and, after they are finished 202 electronic shopping, the consumer 112 can trigger an e-commerce transaction check out process. The consumer 112 uses the mobile device 114 to send control commands using SDK 102 for a mobile payment transaction 204. When a mobile payment transaction 204 is detected, the server 110 sends control commands to prompt for the user handle 206. The consumer 112 enters the unique time sensitive handle at a form field of an interface on merchant website 106. The merchant website 106 or SDK 102 transmits the unique time sensitive handle payment server 110. The payment server 110 determines the mobile device 114 and/or wallet application 104 linked to the unique time sensitive handle using the repository of user account profiles. The user account profile associates the unique time sensitive handle with an identifier for mobile device 114 and/or an identifier for wallet application 104 to determine where to transmit the confirmation request to. The payment server 110 transmits the confirmation request to the associated wallet application 104 and mobile device 114.

The consumer 112 signs into their account or profile, at 230, using a mobile device 114 and the wallet application 104 to receive a unique time sensitive handle. The wallet application 104 generates the unique time sensitive handle. The unique time sensitive handle can be temporary and expires after a configured time duration or expiration period, such as 10 minutes, 15 minutes, 1 hour, and so on. The SDK 102 sends control commands, at 232, to prompt for the handle. The SDK 102 receives input data for the handle in response to the prompt and transmits, at 234, the input data for the handle to the server 110. The server 110 receives the input data for the handle and determines 210 the corresponding mobile device 114 and wallet application 104. That is, the server 110 determines 210 the mobile device 114 and wallet application 104 linked to the input data for the handle. The server 110 transmits 212 a notification to the mobile device 114 and wallet application 104 with payment details and requests confirmation. The mobile device 114 and wallet application 104 transmit a confirmation message 216 to the server 110 to confirm the mobile payment transaction. The consumer 112 responds 214 to the notification to confirm the transaction 214 at the mobile device 114 and wallet application 104 by signing into their profile or account using the mobile wallet application 104. The server 110 sends 218 a payment token for the confirmed payment amount with other payment data to merchant server 108 to complete the e-commerce transaction.

The consumer 112 visits a merchant website 106 running the SDK 102 checkout service. The SDK 102 prompts the consumer 112 via merchant browser website 106 to enter the time sensitive generated handle at the time of payment. The consumer 112 opens and signs into the wallet application 104 on a mobile device 114. Once authenticated the consumer 112 will use the wallet application 104 on a mobile device 114 to request a generated time sensitive handle associated with a selected funding account or product. That is, different accounts or products can be associated with different handles. The consumer 112 enters the generated handle into the merchant browser website 106 running the SDK 102. The merchant website 106 sends a request to the server 110 for a payment token to process payment for the e-commerce transaction. The server 110 sends a payment token to the merchant server 108 to process payment for the e-commerce transaction. The consumer 112 obtains confirmation on the merchant website 106 that the payment was processed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Figure 4:
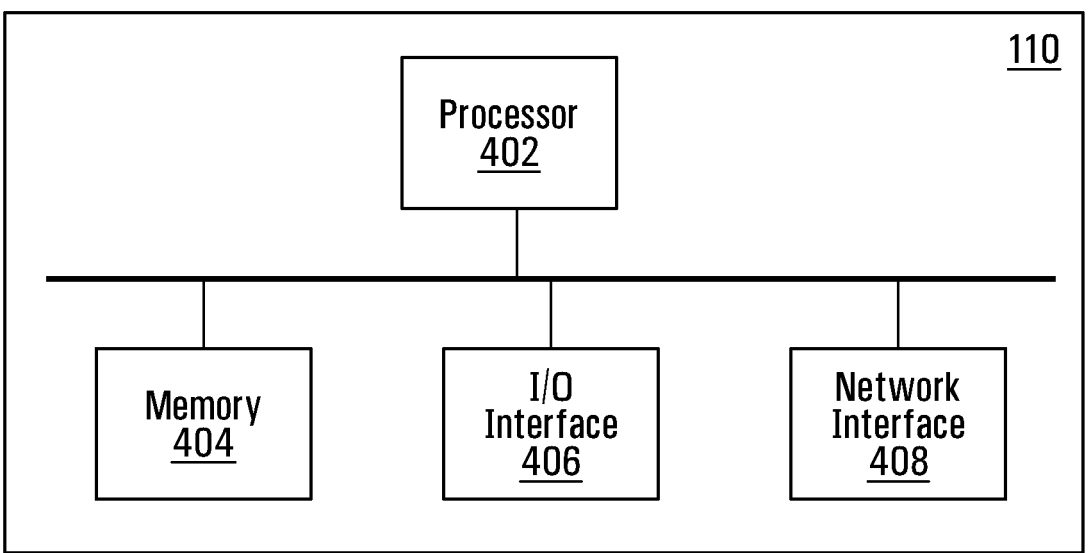
FIG. 4 is a diagram of an example computing device of a system for e-commerce transactions using mobile devices.

FIG. 4 is a schematic diagram of a computing device 400 that may be used to implement aspects of the server 110, mobile device 114 or other device used to access the merchant website 106. As depicted, the computing device 400 includes at least one processor 402, memory 404, at least one I/O interface 406, and at least one network interface 408.

Each processor 402 may be, for example, any type of general-purpose microprocessor or microcontroller, a digital signal processing (DSP) processor, an integrated circuit, a field programmable gate array (FPGA), a reconfigurable processor, or any combination thereof.

Memory 404 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 406 enables the computing device 400 to interconnect with one or more input devices, such as a keyboard, mouse, camera, touch screen and a microphone, or with one or more output devices such as a display screen and a speaker.

Each network interface 408 enables the computing device 400 to communicate with other components, to exchange data with other components, to access and connect to network resources, to serve applications, and perform other computing applications by connecting to a network (or multiple networks) capable of carrying data. Program code is applied to input data to perform the functions described herein and to generate output information and discernible effects. The output information is provided to one or more output devices.

Figure 5:
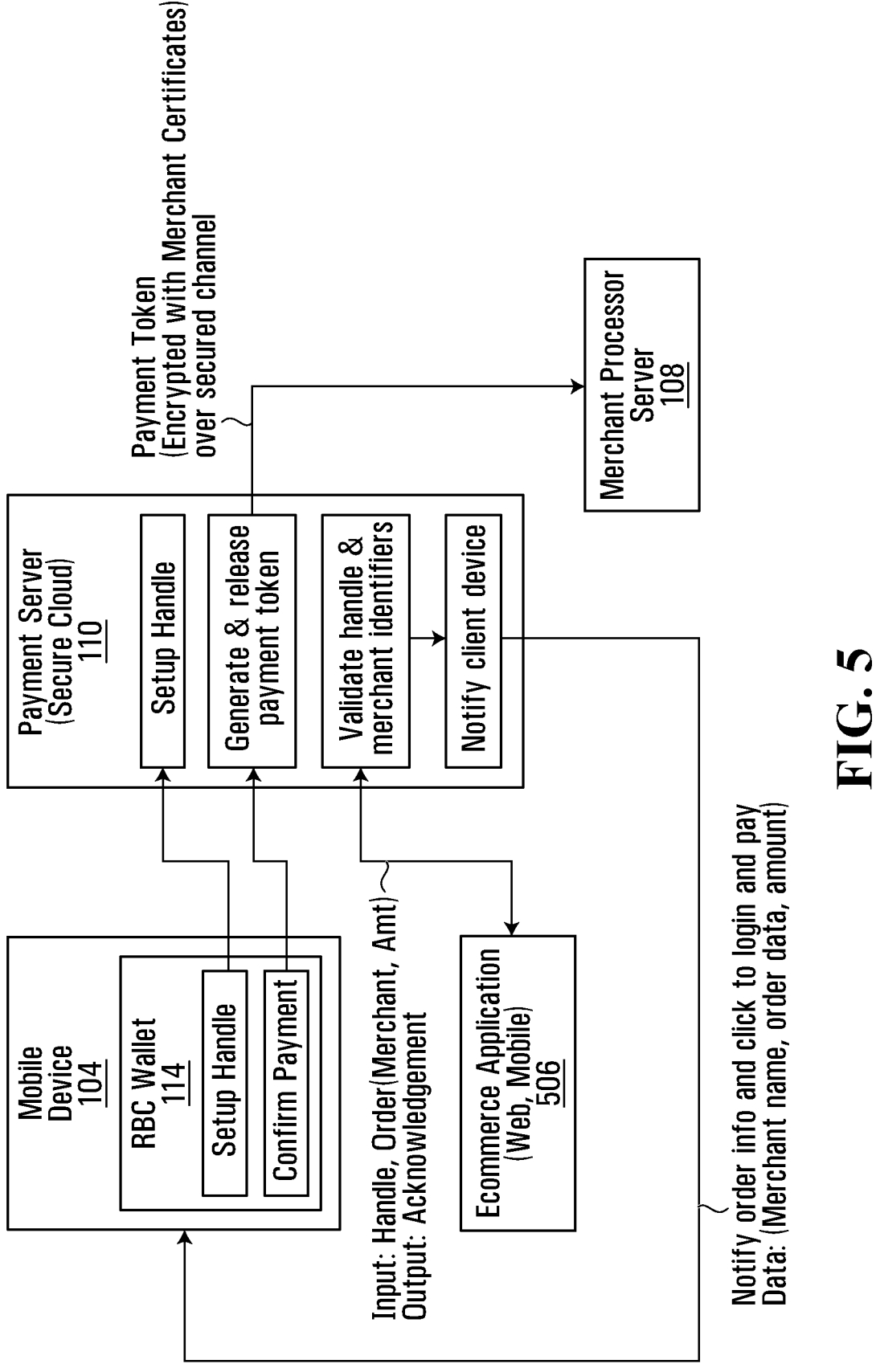
FIG. 5 is a diagram of an example system for e-commerce transactions using mobile devices.

FIG. 5 is a diagram of an example system for e-commerce transactions using mobile device 104. The mobile wallet application 114 configures a handle with the payment server 110. The ecommerce application 506 receives input data for the handle. The ecommerce application 506 transmits the input data for the handle and purchase order details to the payment server 110. The purchase order details include a merchant identifier and purchase amount. The payment server 110 validates the handle, merchant identifiers, and purchase order details. The payment server 110 transmits a payment token over a secured channel to merchant server 108. The payment server 110 can encrypt the payment token using merchant certificates. The payment server 110 transmits a notification to the mobile wallet application 114 on a mobile device 104. The notification includes ecommerce information (merchant identifier, order data, payment data). The mobile wallet application 114 on the mobile device 104 confirms the payment to process the transaction.

The electronic wallet application 114 has non-transitory computer-readable storage medium with computer-executable instructions for causing a processor of the mobile device to implement set of operations. The electronic wallet application 114 operates to authorize a user account at the mobile device 104. The electronic wallet application 114 operates to trigger the display of a confirmation request on a display of the mobile device 104. The electronic wallet application 114 operates to provide a payment confirmation on a display of the mobile device 104.

The payment server 110 has non-transitory computer-readable storage medium with computer-executable instructions for causing a processor of the payment server one 110 to implement a set of operations. The payment server 110 operates to associate the user account with a first handle for processing payment using the electronic wallet application 114. The payment server 110 operates to receive a payment request to process payment for an electronic commerce transaction at a merchant website 106. The payment request indicates the first handle, a merchant identifier and transaction data. As noted, the user has the option to configure multiple handles linked to different wallets 114 or payment accounts in the account profile. The first handle refers to one of the configured handles.

The payment server 110 operates to process the payment request to by verifying the user account associated with the first handle and the merchant identifier using a data repository. That is, the payment server 110 uses the data repository of account profiles to identify the account linked to the received handle. The account profile associates handles with various wallets 114 and payment accounts. The user account identifies the electronic wallet application 114 linked to the received handle.

The payment server 110 operates to transmit the confirmation request to the electronic wallet application 114. The confirmation request includes at least a portion of the transaction data. The electronic wallet application 114 triggers the display of the confirmation request on a display of the mobile device 104.

The payment server 110 operates to receive the payment confirmation from the electronic wallet application 114. In response, the payment server 110 operates to transmit, over a secured channel, a payment security token to a merchant server 108 associated with the merchant website 106. The payment security token can be encrypted using a key link to the merchant server 108. The merchant server 108 can decrypt the encrypted payment security token using a corresponding key.

The payment server 110 operates to transmit an approval message to update the merchant website 106 with payment confirmation notification.

In some embodiments, electronic wallet application 114 has the non-transitory computer-readable storage medium with the computer-executable instructions for causing the processor of the mobile device 104 to generate and transmit a registration request to associate the user account with a first handle. The registration request can also indicate a payment account for example. That is, the user can configure a handle linked to its account using a registration process.

In some embodiments, the payment server 110 has the non-transitory computer-readable storage medium with the computer-executable instructions for causing the processor to process a registration request to associate the user account with the first handle for processing payment using the electronic wallet application 114.

In some embodiments, the payment server 110 has the non-transitory computer-readable storage medium with the computer-executable instructions for causing the processor to receive a first payment account, the first handle for processing payment using the first payment account, and associate the first payment account with the first handle. This enables the user to associate different payment accounts with different handles to provide a flexible yet secure payment process. The electronic wallet application 114 can store different payment accounts that can be linked to different handles in the user account profile.

In some embodiments, the payment server 110 has the non-transitory computer-readable storage medium with the computer-executable instructions for causing the processor to: process a second registration request to associate the user account with a second handle for processing payment using a second payment account; receive a second payment request to process payment for another electronic commerce transaction, the payment request indicating the second handle, the merchant identifier or another merchant identifier, and additional transaction data; process the payment request to determine the user account associated with the second handle; transmit a confirmation request including at least a portion of the additional transaction data; authorize the user account of the electronic wallet application; receive another payment confirmation from the electronic wallet application to process payment using the second payment account; transmit another payment security token to the merchant server associated with the merchant identifier or another merchant server associated with the other merchant identifier, the other payment security token for the second payment account; and transmit an approval message for another payment confirmation notification. That is, different handles can be used to process payments using different payment accounts. The registration process enables a user to link different handles to the different payment accounts. The electronic wallet 114 can manage different payment accounts that can be selected to create the link to different handles.

In some embodiments, the payment server 110 has the non-transitory computer-readable storage medium with the computer-executable instructions for causing the processor to determine an encryption key associated with the merchant server 108 and encrypting the payment security token using the encryption key. The encrypted payment security token for decryption by the merchant server 108 using a corresponding key. The payment server 110 can have different keys for different merchant servers 108.

In some embodiments, the payment server 110 has the non-transitory computer-readable storage medium with the computer-executable instructions for causing the processor to connect with a payment software development kit 102 to receive a mobile payment selection at the merchant website 106; prompt for the first handle at a form field displayed at the merchant website 106; and transmit the first handle as part of the payment request.

In some embodiments, the payment server 110 has the non-transitory computer-readable storage medium with the computer-executable instructions for causing the processor to process a registration request to associate the user account with the first handle by verifying uniqueness of the first handle by determining that the first handle is different than all handles of a repository of handles stored on or accessible by the payment server 110. In this way, the payment server 110 ensures uniqueness of the handles so that a given handle does not map to multiple user accounts.

In some embodiments, the payment server 110 has the non-transitory computer-readable storage medium with the computer-executable instructions for causing the processor to process a registration request to associate the user account with the first handle comprises determining that the first handle is at least a minimum size. The payment server 110 may require that the first handle be at least of a threshold size.

In some embodiments, the payment server 110 has the non-transitory computer-readable storage medium with the computer-executable instructions for causing the processor to generate or identify a unique handle for the first handle, the unique handle being different than all active handles of a repository of handles stored on or accessible by the payment server 110. In some embodiments, each handle can have an associated status such as active or inactive. Before changing an inactive status to an active status, the payment server 110 can check to ensure that handle is unique as compared to all other active handles.

In some embodiments, the payment server 110 has the non-transitory computer-readable storage medium with the computer-executable instructions for causing the processor to generate or identify a time sensitive handle for the first handle. The time sensitive handle being active for the electronic commerce transaction only for a defined period of time. After the expiration of the time period, the handle may change from an active status to an inactive status for example.

In some embodiments, the transaction data comprises user data. The payment server 110 can process the payment request to determine the user account associated with the first handle by determining that the user data matches stored data for the user account. For example, the transaction data may include an address or phone number. The payment server 110 can match the address or phone number to stored address or phone number in the user account profile.

In some embodiments, the payment server 110 has the non-transitory computer-readable storage medium with the computer-executable instructions for causing the processor to process a registration request to associate the first handle with the mobile device 104 and the electronic mobile wallet 114, and process the payment request to determine the user account associated with the first handle by: determining the mobile device 104 associated with the first handle. The payment server 110 can have an account profile to associate the mobile device 104 with the electronic wallet application 114.

In some embodiments, the payment server 110 has the non-transitory computer-readable storage medium with the computer-executable instructions for causing the processor to authorize the user account of the electronic wallet application 114, and receive the payment confirmation from the electronic wallet application 114 by receiving a valid login to the electronic wallet application 114.

In some embodiments, the payment server 110 has the non-transitory computer-readable storage medium with the computer-executable instructions for causing the processor to transmit a transaction status update for display on the merchant website 106 to indicate that the transaction is still pending until receipt of the payment confirmation. As noted, there may be a delay between the time of the payment request is triggered at the merchant site 106 and the time when the payment is processed using the mobile device 104 and the merchant server 108. In order to avoid looking at the processes timed out, the merchant site 106 can update its display to indicate a still pending status to provide feedback to the user.

Figure 6:
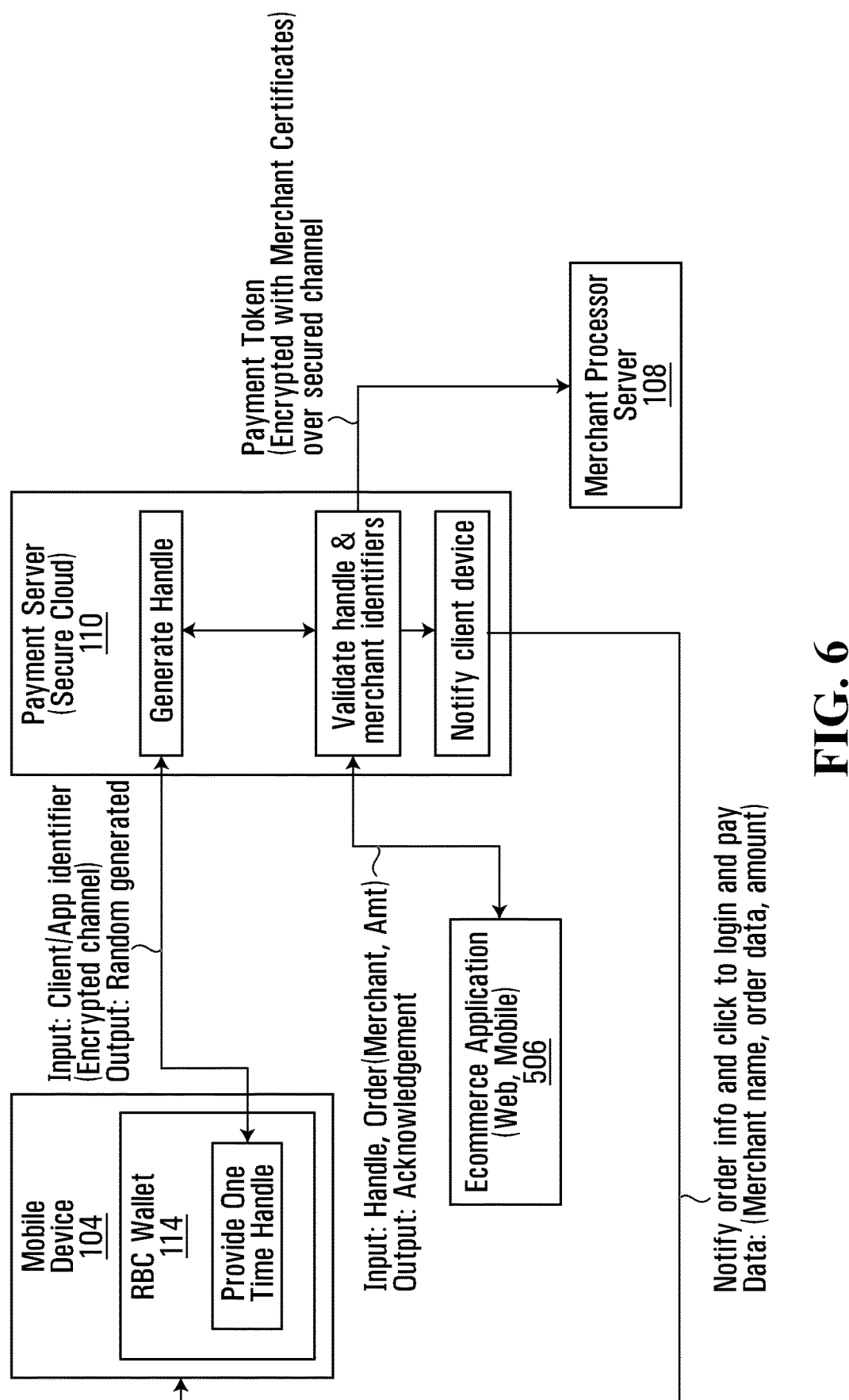
FIG. 6 is a diagram of an example system for e-commerce transactions using mobile devices.

FIG. 6 is a diagram of an example system for e-commerce transactions using mobile devices. The mobile wallet application 114 provides input data to the payment server 110. The one-time handle is generated by the payment server 110. In some embodiments, the one-time handle is randomly generated by the payment server 110. The mobile wallet application 114 provides the one-time handle to the consumer 112 for the e-commerce transaction. A consumer 112 can enter the one-time handle to an ecommerce application 506. The ecommerce application 506 transmits the handle and purchase order details to payment server 110. The purchase order details include a merchant identifier and purchase amount. The ecommerce application 506 can include the merchant website 106 in some embodiments. The payment server 110 validates the handle and purchase order details. The payment server 110 transmits a payment token over a secured channel to the merchant server 108. The payment server 110 can encrypt the payment token using merchant certificates. The payment server 110 transmits a notification to mobile wallet application 114. The notification includes ecommerce information (merchant identifier, order data, payment data). In some embodiments, the first handle is active to process a single payment request. The payment server 110 is configured to de-activate the first handle after transmitting the payment security token. That is, the first handle can be a single use handle. In some embodiments, the first handle is active to process a single payment request, wherein the method comprises de-activating the first handle after transmitting the payment security token.

Figure 7:
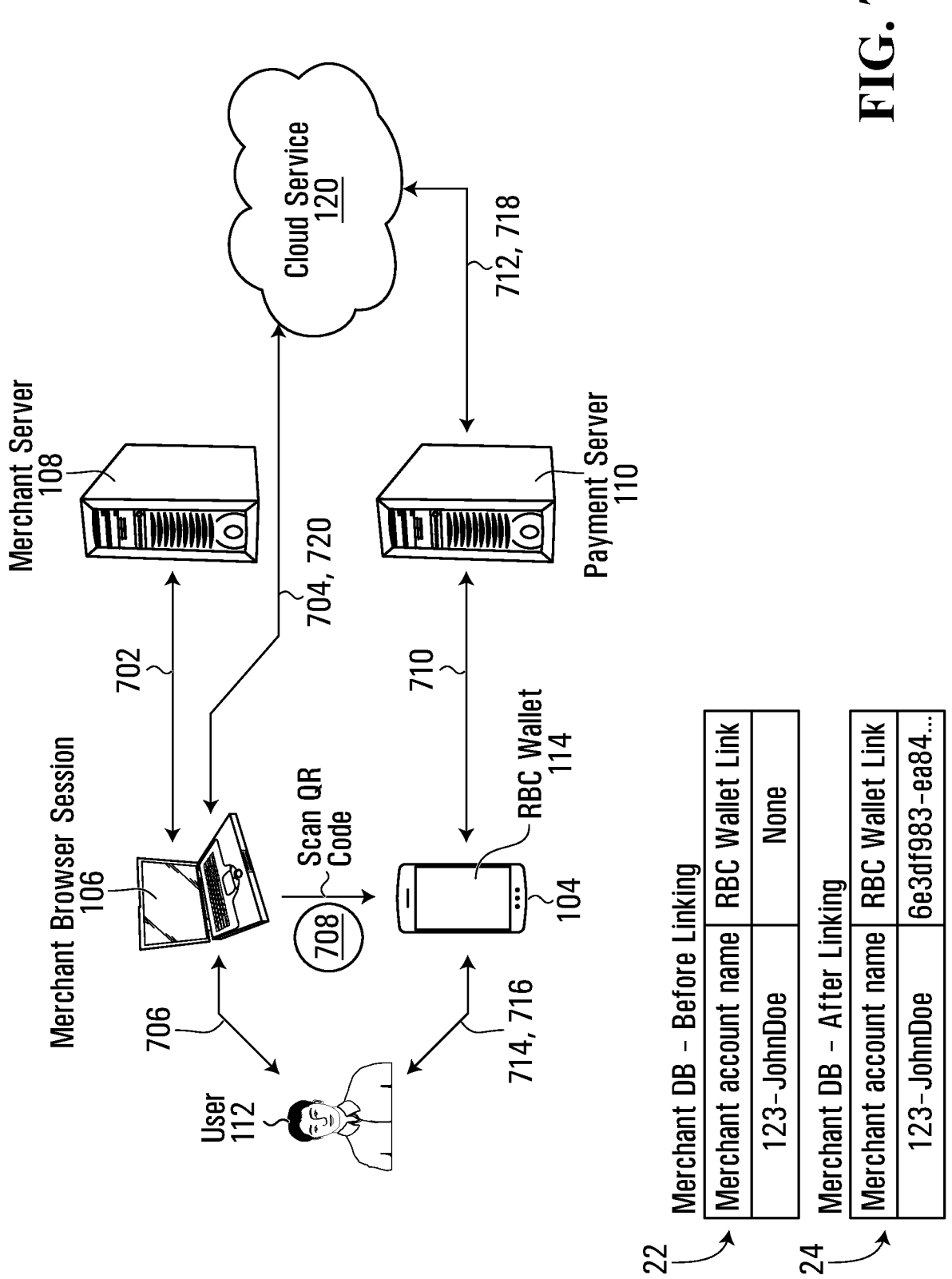
FIG. 7 is a diagram of another example workflow of a system for transactions using mobile devices according to some embodiments.

FIG. 7 is a diagram of another example workflow of a system 100 for transactions using mobile devices according to some embodiments. This example workflow can relate to an initial usage of the code to link a consumer account of the merchant with a particular wallet application 104 (e.g. to create a link between an electronic wallet application identifier for the user account and the customer account identifier registered with merchant server 108 for subsequent transactions). The code can be an example user account identifier in that the server 110 can use the code to locate the corresponding user account and associated wallet application 114. In this example embodiment, the system 100 includes a device that is configured to display a merchant website 106. The device can be different than the mobile device 114 or the device may be the same as mobile device 114, for example. In some embodiments, the device is accessible by mobile device 114 with the wallet application 104 for at least part of the workflow to capture the code, for example. In some embodiments, the mobile device 114 is the device and is operable to display the merchant website 106, such as by a mobile browser or a mobile merchant application. Accordingly, the merchant website 106 can refer to a merchant mobile application. The consumer 112 wants to make a purchase at the merchant website 106 and may have an account registered with the merchant server 108 (e.g. customer account identifier and password, for example). In this example embodiment, the payment for the transaction can be approved or confirmed using the mobile device 114 with the wallet application 104.

The merchant server 108 registers with the payment server 110 in order to generate and receive an encryption key unique to the merchant. For example, the encryption key can include a private key for the merchant and a public key for the financial institution. The encryption key is exchanged between the payment server 110 and the merchant server 108 in order to secure data. The financial institution can use a corresponding public key to decrypt data protected using the merchant private key. In some embodiments, the encryption key is not provided to the merchant website 106 and the mobile device 114 so that it cannot be intercepted by an unauthorized party by phishing or another malicious intervention technique.

In some embodiments, the user requests to purchase one or more products and/or services at a merchant website 106. The user can initiate a payment process for the products and/or services at the merchant website 106. The user can select a payment option for purchasing the products and/or services using the mobile wallet application 104. The payment options may include different payment card options, for example. In some embodiments, the user can provide an account name (e.g. customer account identifier) to the merchant website 106 as part of a sign in or log in process. This can provide traceability and some level of security. Also, this can enable creation of a link between the wallet application

104 and the merchant website 106 or server 108 for subsequent use, as will be described in relation to FIG. 8. For example, system 100 can create a link between an electronic wallet application identifier for the user account and the customer account identifier for subsequent transactions. In some embodiments, the workflow could be modified to have an anonymous consumer (e.g., user is not logged into merchant).

At 702, the merchant server 108 creates a request package which is secured by the encryption key and transmits the request package to the merchant website 106. The merchant server 108 can create a request package in response to receiving a selection at the merchant website 106 to pay for goods and/or services using a mobile device 114 and the wallet application 104, such as an electronic button to "pay with mobile wallet". The "request package" can include different data elements such as: description of goods and/or services, item amount, tax amount, total amount, merchant identifier, merchant account information (including customer account identifier), and so on. Additionally, the request package can include information about the consumer or user on file from the merchant, such as phone number, address, and so on. The additional information regarding the consumer or user can be confirmed by a financial institution (providing the financial account to the consumer and/or operating payment server 110) to provide additional confidence level to the merchant associated with the merchant website 106. For example, if the user is purchasing products or services with the payment total over a threshold amount then verification may be implemented by the financial institution. For example, if the consumer selects to have the product delivered, the merchant server 108 can provide the user's address on file to the financial institution as part of the request package, and the financial institution can confirm if the address matches with user's address on file with the financial institution.

The following provides a non-limiting example request package:

```
{
  amt = "464.35";
  cur = CAD;
  desc = "Weekend Getaway at Royal York Hotel";
  expires = 1498047986457;
  firstName = John;
  id = "01ad4ac5-28ac-4ed4-834c-c5e50e74db66";
  infoReq = ( payment,
      email,
      address,
      pushNotification
      );
  jti = "b4c67aea-2601-4069-b54c-e1cbab0164fc";
  last Name = Doe;
  merchantId = 3879203;
  merchantName = "Expedia";
  sub = "John Doe";
  tax = "60.37";
  total = "524.72";
  userAccountId = "7c2b727d-a4d0-44e2-b6c0-5c0753fa3454";
}
```

The request package can also be used in the process referred to herein in relation to the handle. In some embodiments, the request package can be signed with a merchant private key. This can help ensure that the request package is generated by merchant's back-end server 108 with its private key. In some embodiments, the request package is encrypted by the merchant server 108 with a financial institution's public key to ensure that only the financial institution with the private key can decrypt the contents of the request package.

At 704, the merchant website 106 provides the request package to a cloud service 110 for provision to the payment server 110. In some embodiments, the request package is encrypted using the encryption code so that an unauthorized party cannot access the request package.

At 706, the merchant website 106 browser session displays a code with machine-readable data, such as a QR code, for example. The code can be encrypted using an encryption key that is exchanged between the payment server 110 and the merchant server 108. The code contains a reference to the request package so that the request package can be retrieved using the reference. The reference and the request package are used to process the transaction. The payment information is not provided to the merchant website 106 and the merchant server 108 so that the sensitive information cannot be accessed by phishing, hacking or other malicious unauthorized access. Further, the merchant website 106 and the merchant server 108 do not receive the payment information and are not required to store the sensitive payment information.

For example, the code can be a QR code that contains an URL to the request package. The reference can be inside the URL. In some embodiments, this URL can be for temporary one time use only. In some embodiments, when the request package is delivered to the cloud service 120, in response the cloud service 120 generates a one-time use URL (including the reference) and QR code containing that URL. In some embodiments, the QR code is not encrypted as it is a one-time use URL which provides some protection.

The following is an example of QR code content: https://d2x1a3hyfe6kmg.cloudfront.net/app-e/rb/w/r?r=c71783fe-8295-4208-a472-64b855600af6. In this example, "c71783fe-8295-4208-a472-64b855600af6" can be a temporary one time use "reference" to the request package. In an embodiment where a mobile browser on a mobile device 114 is used to access the merchant website 106 (e.g. on the wallet application 104. At 714, the wallet application 104 displays a confirmation request for the transaction (e.g. request for payment confirmation) using a portion of the transaction data, such as the total amount and the merchant identifier, for example. The consumer 112 approves the purchase on the wallet application 104 by accepting or approving the confirmation request (e.g. transaction approval) using the mobile device 114. The transaction approval can include a selected payment type, such as selection of a specific credit card, value card, or other payment option.

As noted, there may be an authentication process required at the mobile device 114 in order to access the wallet application 104 and approve the request for payment confirmation (e.g. confirmation request for the transaction). The authentication process can involve biometric authentication such as a thumbprint, fingerprint, eye or facial authentication process. This may provide another layer of security for the transaction as only authenticated consumers can provide the transaction approval at the wallet application 104.

In some embodiments, at 716, the consumer 112 can approve the creation of a link between the wallet application 104 and the merchant account associated with the consumer 112. For example, the wallet application 104 can receive link approval to create a link between an electronic wallet application identifier for the user account and the customer account identifier for subsequent transactions. In such embodiments, the step of receiving or capturing the code at the wallet application 104 may not be required as the link can be used to determine the customer account identifier or the electronic wallet application identifier for subsequent transactions. The merchant server 108 or the payment server 110 can include a database linking consumer account identifiers to wallet application identifiers for efficient processing of subsequent transactions.

At 718, the payment server 110 transmits, to the cloud service 120, a payment package and a wallet link indication if the consumer 112 approved the linking. The following provides a non-limiting example payment package:

```
paymentPackage = {
requestPackageId = "01ad4ac5-28ac-4ed4-834c-c5e50e74db66",
paymentToken = "e7dad004-770f-49b5-9615-1fe4093b8680-
9D461700E7D38EFD3012EF67B16F801F58251E453CE66CD5625FA4B498B2D005",
paymentTokenExpiry = "2017-03-14T15:37:25"
timestamp = "2017-03-14T15:36:21",
amount = "524.72",
currency = "CAD"
}
``` same device 114 as the wallet application 104, the same link can be used to deeplink from the merchant browser session 106 to the wallet application 104.

At 708, the wallet application 104 scans or reads the code displayed on the merchant website 106 to obtain the reference to the request package. For example the wallet application 105 can interact with the camera of the mobile device 114 to capture an image of the QR code displayed on the merchant website 106.

At 710, the wallet application 104 submits the reference to the payment server 110. At 712, the payment server 110 retrieves the request package from the cloud service 120 using the reference. In some embodiments, the payment server 110 can store request packages which can be retrieved using corresponding references. The payment server 110 can transmit transaction data from the request package to the Before linking, a database record 122 of the database managed by the merchant server 108 (or payment server 110) does not link the account name to a particular wallet application 104. After approving the linking, a database record 124 of the database managed by the merchant server 108 (or payment server 110) links the account name to the wallet application 104. The database record 124 identifies the wallet application 104 using a unique identifier. The unique identifier for the wallet application 104 can be generated at payment server 110. At the payment server 110, the connection between merchant's user account (this could be an account number or unique identifier generated from merchant) and the unique identifier for the wallet application 104 can be maintained. The payment server 110 can identify if the merchant's user account has the unique identifier for the wallet application 104 associated with it or not. In some embodiments, the merchant server 108 can add the wallet application identifier to the request package for subsequent transactions. In some embodiments, the payment server 110 can do the look up for the wallet application identifier.

Examples of additional information or data fields stored in records of the database at merchant server 108:
linked-to-wallet: Yes or No
Wallet-identifier: W23498374894

Example of additional information or data fields stored in records of the database at payment server 110:
Linked-merchant-id: M38923
Linked-merchant-user account id: 9381738495
Link-created-at: 2017-03-04 14:05:23
Wallet-identifier: W23498374894
Wallet-app-uuid:                211FA29B-0103-4BCE-8875-4994CD269A07
Wallet-push-notification-id:
c4d983b172ea7b83aa35e22f3b3efd7db637c521c0be0154d
6a86443be6b70b7

At 720, the cloud service 120 provides a notification of the transaction and the merchant website 106 browser session resumes to display the transaction confirmation. Accordingly, an initial purchase with the merchant can require the scan of the code at the mobile device 114 to create the link between the consumer account name of the merchant and the wallet application 104. Subsequent purchases might not require the code scanning step.

Figure 8:
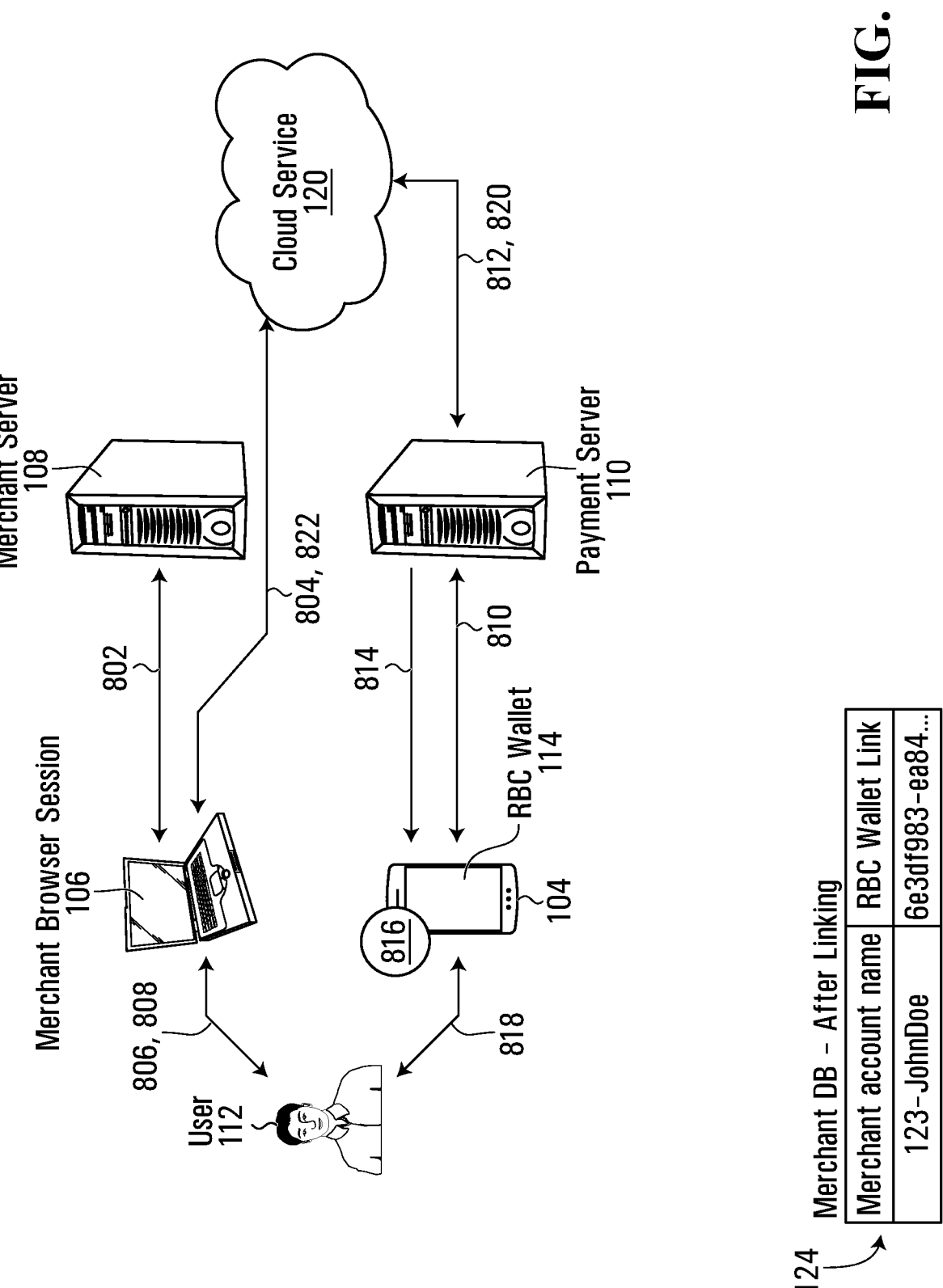
FIG. 8 is a diagram of another example workflow of a system for transactions using mobile devices according to some embodiments.

FIG. 8 is a diagram of another example workflow of system for transactions using mobile devices 104 according to some embodiments. This example embodiment relates to a workflow for subsequent usage after the initial link has been created between the consumer account name of the merchant and the particular wallet application 104. As noted, subsequent purchases might not require the code scanning step. Instead, the workflow may proceed directly to the confirmation request at the wallet application 104. The merchant server 108 or the payment server 110 can access relevant data records using the link between the electronic wallet application identifier for the user account and the customer account identifier for these subsequent transactions. For example, the merchant server 108 can locate the electronic wallet application identifier in the database using the customer account identifier. The electronic wallet application identifier is used to identify the wallet application 104 in order to prompt or trigger display of the request for payment confirmation at the wallet application 104. If the consumer 112 switches mobile devices 114 or reinstalls the wallet application 104 then they may need to rescan the code to create the link between the consumer account name of the merchant and the wallet application 104 as there may be a different electronic wallet application identifier. The electronic wallet application identifier is used to identify a wallet application 104 in order to deliver data and/or commands to the wallet application 104, such as requests for payment confirmation.

At 802, the merchant server 108 creates a request package and transmits it to the merchant website 106. The request package can include the customer account identifier and/or the electronic wallet application identifier. At 804, the merchant website 106 provides the request package to the cloud service 120. At 806, the merchant website 106 browser session optionally displays indicia to trigger the secure payment process. The merchant website 106 browser session optionally displays the code, such as the QR code for example. The code contains a reference to the request package. For subsequent purchases, after an approval of the linking is received, a push notification can be automatically sent out to the wallet application 104 without capture of the QR code. This can streamline the workflow. However, in some embodiments, the merchant website 106 can display the QR code in case the push notification is not delivered (e.g., user changed to a new phone, so the previous wallet indicator may be out of date).

At 808, the consumer 112 activates or selects the indicia to trigger the secure payment process using the wallet application 104. Selection of the indicia can also include an indication that this is a returning consumer 112 and a subsequent purchase by a consumer 112 who has previously linked their account name with the merchant to a particular wallet application 104. The merchant website 106 browser session invokes a payment request notification API (such as provided by SDK 102, for example) at the cloud service 120. At 812 and 814, the cloud service 120 requests the payment server 110 to send a push notification to request payment confirmation with the request package. The request package can indicate the consumer account identifier, for example. The payment server 110 can retrieve the electronic wallet application identifier from the stored data record of the merchant database using the link between the consumer account identifier (or merchant account) and the electronic wallet application identifier (for the wallet application 104). At 814, the payment server 110 sends a push notification to the wallet application 104 using the electronic wallet application identifier. The push notification can include a request for payment confirmation including a reference to the request package. The notification can also include a portion of transaction data (e.g. merchant, amount). The payment server 110 can maintain association between wallet identifier and link to merchant account.

At 816, the wallet application 104 receives the request detail and displays the request for payment confirmation for approval. At 818, the consumer 112 approves the confirmation request for the transaction by selecting indicia at the wallet application 104 and/or providing input data to the mobile device 114 (e.g. biometric verification). The wallet application 104 receives the transaction approval to the request for payment confirmation. At 820, the payment server 110 transmits the payment package (including the transaction approval) to the cloud service 120. At 822, the merchant website 106 receives the payment package and/or the transaction approval. The merchant website 106 resumes the browser session to finalize the transaction.

Figure 9:
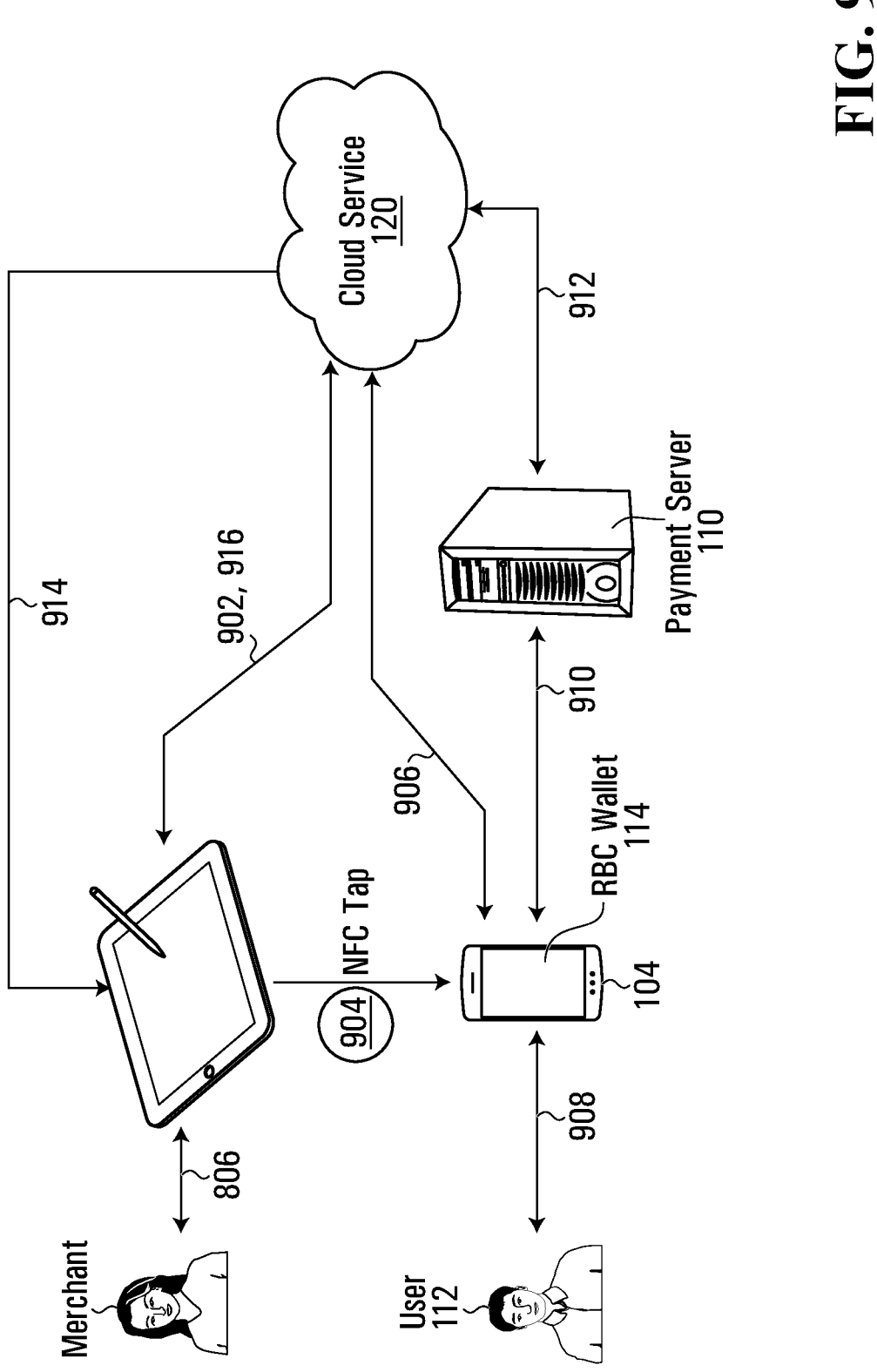
FIG. 9 is a diagram of another example workflow of a system for transactions using mobile devices according to some embodiments.

FIG. 9 is a diagram of another example workflow of system for transactions using mobile devices according to some embodiments. As noted, in some embodiments the consumer 112 can be face-to-face with a merchant for the transaction. For example, the consumer 112 can be in the physical store of the merchant and this may be referred to as an in-store transaction. In some embodiments the merchant may not have credit card processing equipment or other point-of-sale terminal capabilities. However, the merchant can have a merchant device 116 with the capability to exchange data with the wallet application 104. For example the merchant device 116 can have NFC and Internet capabilities to exchange data with the wallet application 104 and cloud service 120. The mobile device 114 and the wallet application 104 can be registered with the merchant to receive push notifications such as requests for payment confirmations for the transactions. The merchant device 116 can be registered to receive push notifications from the cloud server 120. The consumer 112 has a mobile device 114 with a wallet application 104 installed thereon. The consumer 112 wants to make a purchase from the merchant in person.

At 902 the merchant uses the merchant device 116 to initiate the payment process for the transaction. The merchant device 116 creates a request package and transmits the request package to the cloud service 120. At 904, the consumer 112 taps (e.g. brings it within a pre-defined range or location) its mobile device 114 on the merchant device 116 or otherwise interacts with the merchant device 116. The merchant device 116 transmits a request reference identifier to the mobile device 114. At 906, the wallet application 104 retrieves the request package from the cloud service. In some embodiments, the steps can be implemented by the consumer 112 scanning a code displayed on the merchant device 116 using the wallet application 104 and mobile device 114. At 908, the wallet application 104 displays a request for payment confirmation, which is confirmed by the consumer 112 using the mobile device 114. The wallet application 104 receives a transaction approval to the displayed request for payment confirmation. At 910 and 912 the payment server 110 creates a payment package for provision to the cloud service 120. At 914, the cloud service 120 sends the push notification with a reference identifier for the payment package to the merchant device 116. At 916, the merchant device retrieves the payment package from the cloud service 120. The payment for the purchase transaction is complete. In some embodiments, the merchant can have an account with the payment server 110. The payment request can be directed to the merchant account in real time or periodically such as daily, weekly or monthly.

FIGS. 10 to 30 are screenshots of different aspects of a system for transactions using mobile devices according to some embodiments.

FIG. 10 is a screenshot of an interface for wallet application 104. The interface includes a form of form fields and corresponding field values. Example form fields include username, device token, merchant, notification options, and so on. The interface can be used to configure the wallet application 104 to process payments for specific merchants and merchant user accounts (e.g. consumer or user accounts registered with the merchant). The form can include selectable values to populate field values corresponding to different form fields. The interface may be accessible after authorization by the wallet application 104, such as by biometric authentication.

Figure 11:
FIG. 11 is a screenshot of an interface of merchant website of a system for transactions using mobile devices according to some embodiments.

FIG. 11 is a screenshot of an interface for a merchant website 106. The interface includes selectable indicia 1102 to trigger the payment process using the wallet application 104. The interface can also include a summary of payment details regarding a product or service offered by a merchant website 106.

Figure 12:
FIG. 12 is a screenshot of an interface of merchant website of a system for transactions using mobile devices according to some embodiments.
Figure 12:

FIG. 12 is a screenshot of an interface for a merchant website 106. The interface includes selectable indicia 1102 to trigger the payment process using the wallet application 104. The interface can also include a summary of payment details regarding a product or service offered by the merchant website 106. The interface can also include a form field to receive a phone number or other identifier for the mobile device 114 along with selectable indicia 1104 to send a message to the phone number or identifier for the mobile device 114. The message can indicate details of the transaction for notification or confirmation. The message can also include a code that can be entered into the wallet application 104 as part of the payment process. The interface can include a code 1106 readable by the wallet application 104 as part of the payment process. The interface can also indicate time remaining to complete the transaction. The code 1106 can be created using the keys exchanged between the payment server 110, the merchant server 108 or the merchant website 106. The code 1106 can be encrypted using the keys for security.

Figure 13:
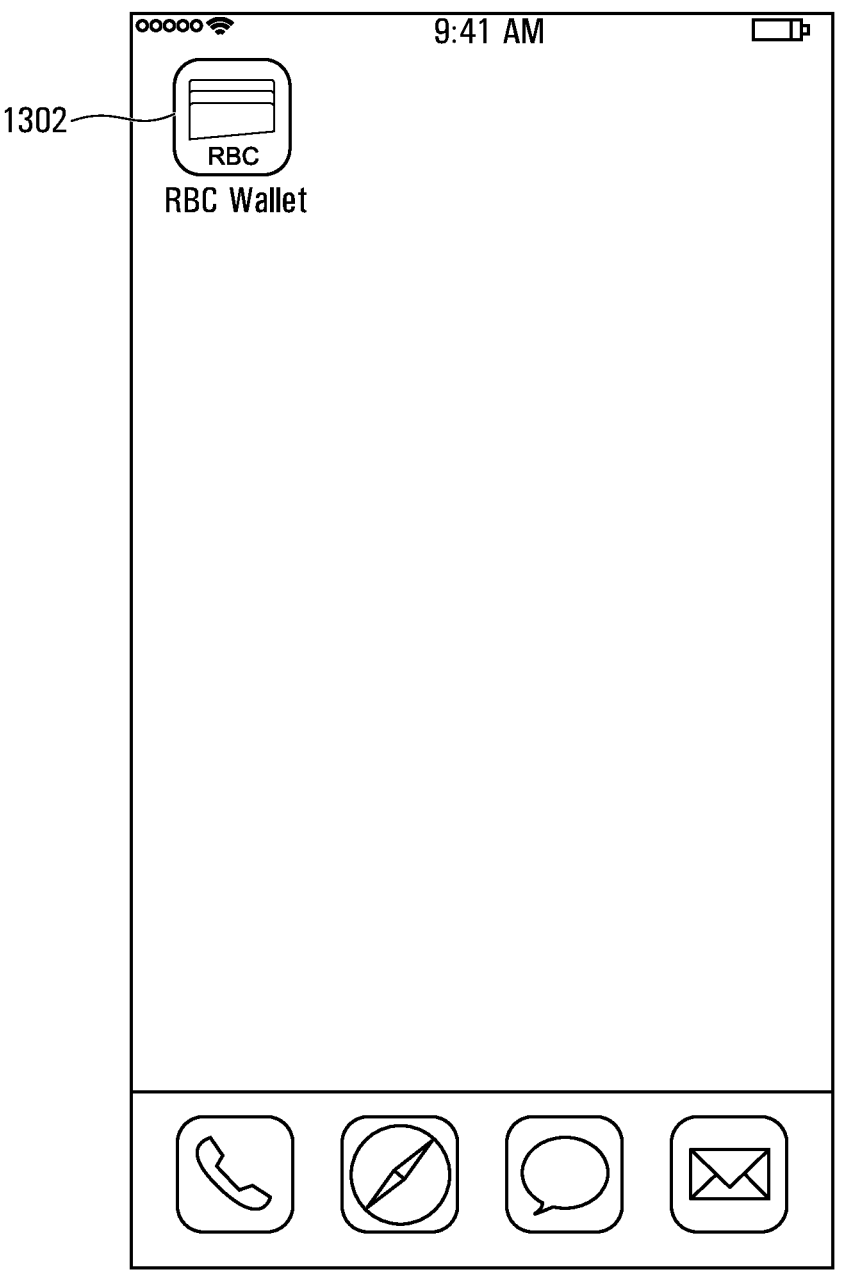
FIG. 13 is a screenshot of an interface of a mobile device of a system for transactions using mobile devices according to some embodiments.

FIG. 13 is a screenshot of an interface for the mobile device 114 including an icon 1302 to trigger the wallet application 104.

Figure 14:
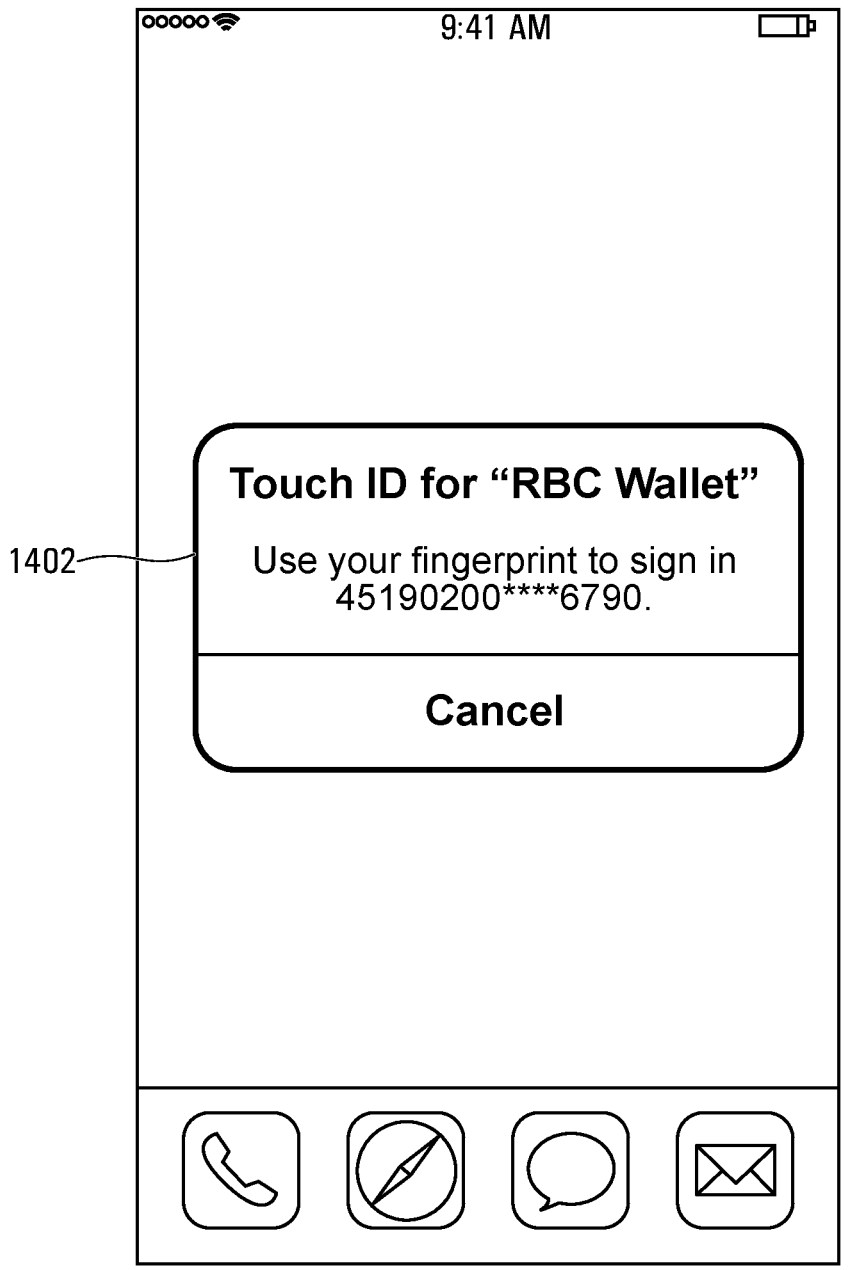
FIG. 14 is a screenshot of an interface of a mobile device of a system for transactions using mobile devices according to some embodiments.

FIG. 14 is a screenshot of an interface of the mobile device 114 and wallet application 104 with indicia 1402 to authenticate a user using biometric authentication, such as a fingerprint for example. This can be an example authorization of a user account at mobile device 114.

Figure 15:
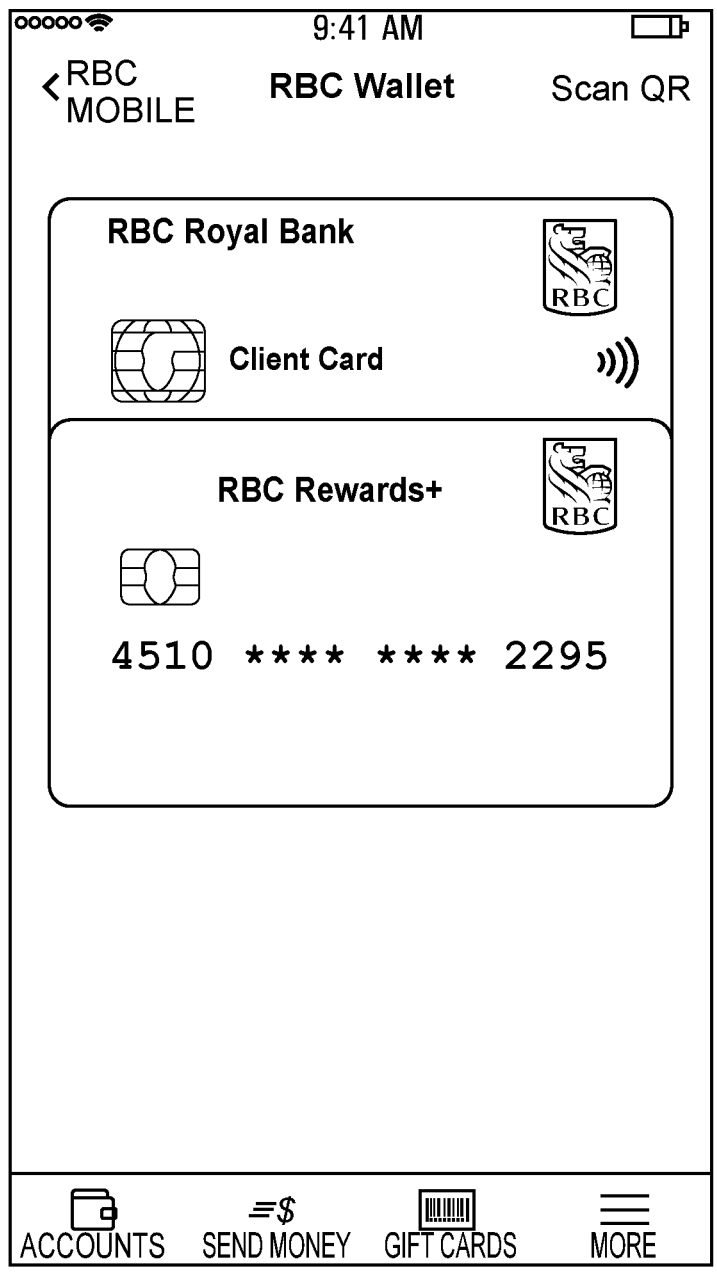
FIG. 15 is a screenshot of an interface of a mobile device of a system for transactions according to some embodiments.

FIG. 15 is a screenshot of an interface of the wallet application 104 with visual representations of one or more payment accounts such as bank account, credit card account, and so on. The wallet application 104 enables selection of a payment account for a particular transaction. The wallet application 104 enables the addition of additional payment options for transactions. The wallet application 104 enables the removal of payment options. Accordingly, the wallet application 104 enables users to add, remove, and update payment options for transactions. As noted herein, the interface with different payment accounts can be used to link or associate a handle with a particular payment account.

Figure 16:
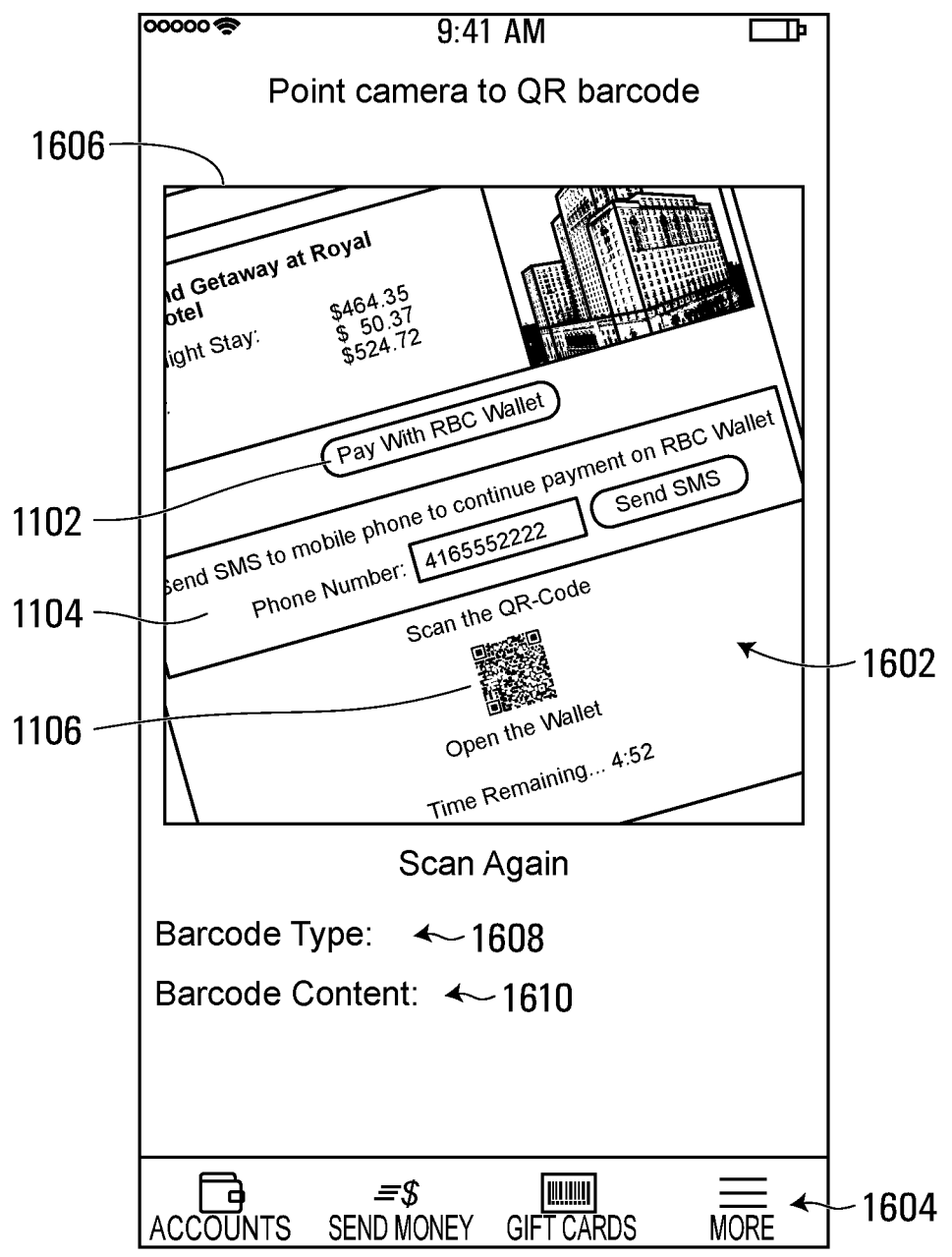
FIG. 16 is a screenshot of an interface of a mobile device of a system for transactions according to some embodiments.

FIG. 16 shows an interface 1602 for the merchant website 106 and another interface 1604 for the wallet application 104. The interface 1604 for the wallet application 104 includes an imaging component 1606 to capture an image of the code 1106 displayed on the merchant website 106. The imaging component 1606 enables the wallet application 104 to automatically capture or receive the code 1106. The interface 1604 for the wallet application also includes a form field for code type 1608 and a form field for code content 1610. In some embodiments, the wallet application 104 includes a form field to receive a code in other ways and capturing an image is just one example.

Figure 17:
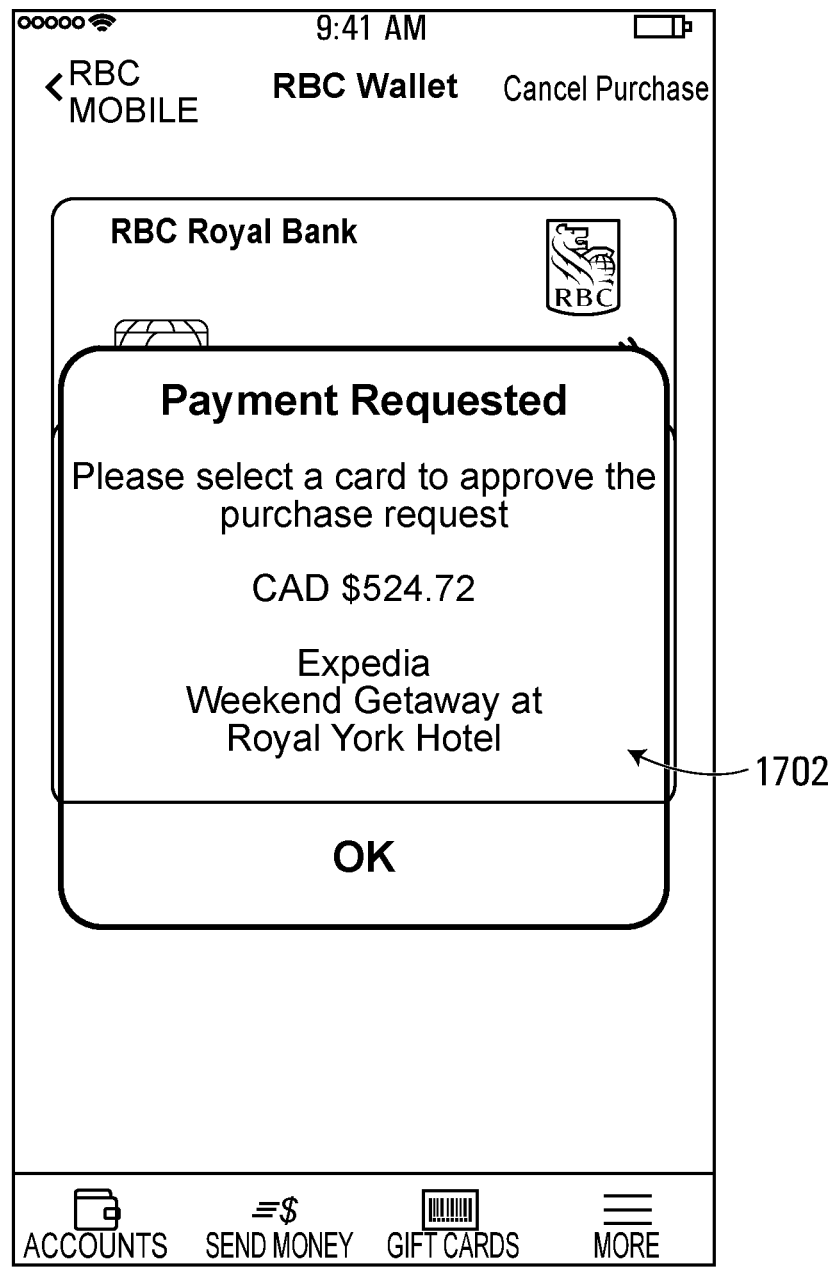
FIG. 17 is a screenshot of an interface of a mobile device of a system for transactions according to some embodiments.

FIG. 17 shows an interface for the wallet application 104 with a confirmation request 1702 to confirm a purchase option for payment of the transaction. The confirmation request 1702 can be used to select a purchase option at the wallet application 104. The confirmation request 1702 can include information regarding the merchant, the goods or services, and the total payment amount.

Figure 18:
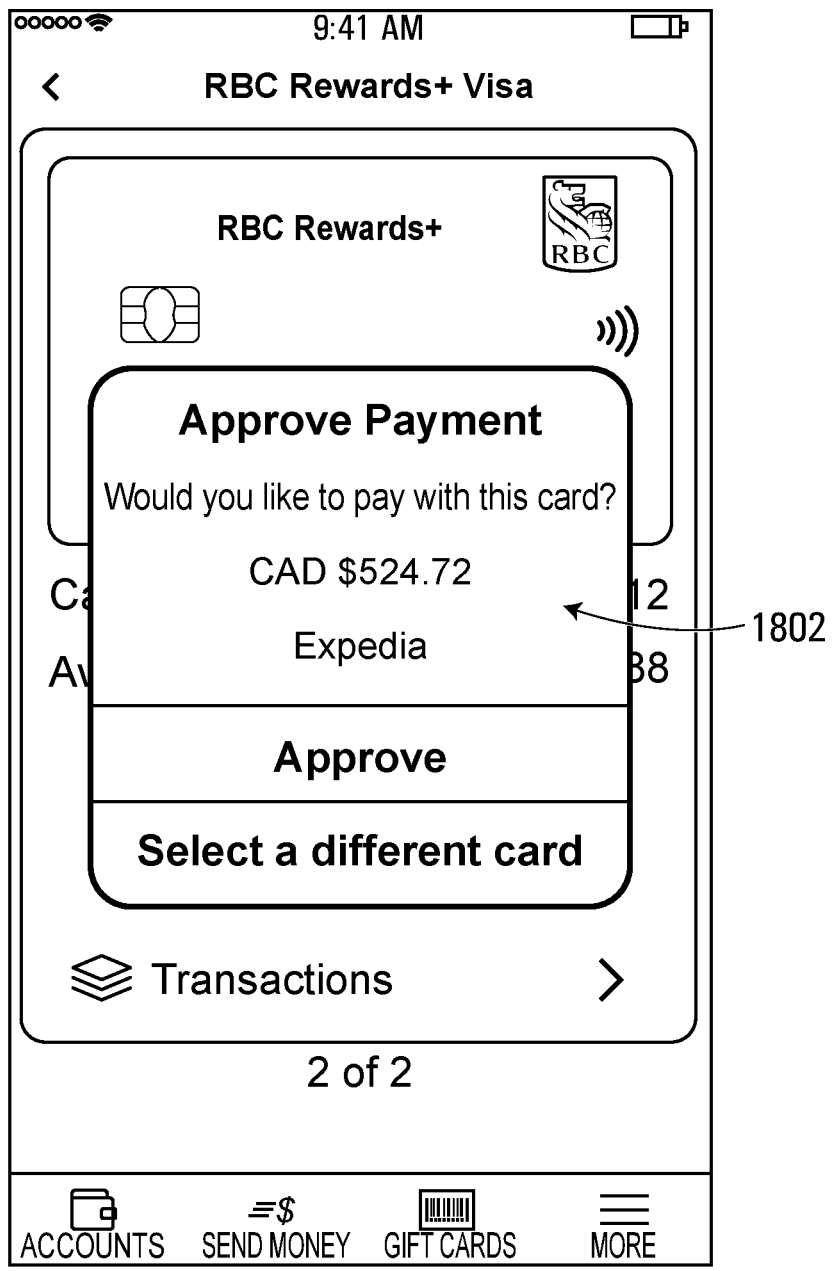
FIG. 18 is a screenshot of an interface of a mobile device of a system for transactions according to some embodiments.

FIG. 18 shows an interface for the wallet application 104 with a confirmation request 1802 to confirm payment for the transaction using the selected purchase option. The confirmation request 1802 can be used to approve payment at the wallet application 104. The confirmation request 1802 can include information regarding the merchant, the goods or services, and the total payment amount. The confirmation request 1802 can include an option to select a different purchase option.

Figure 19:
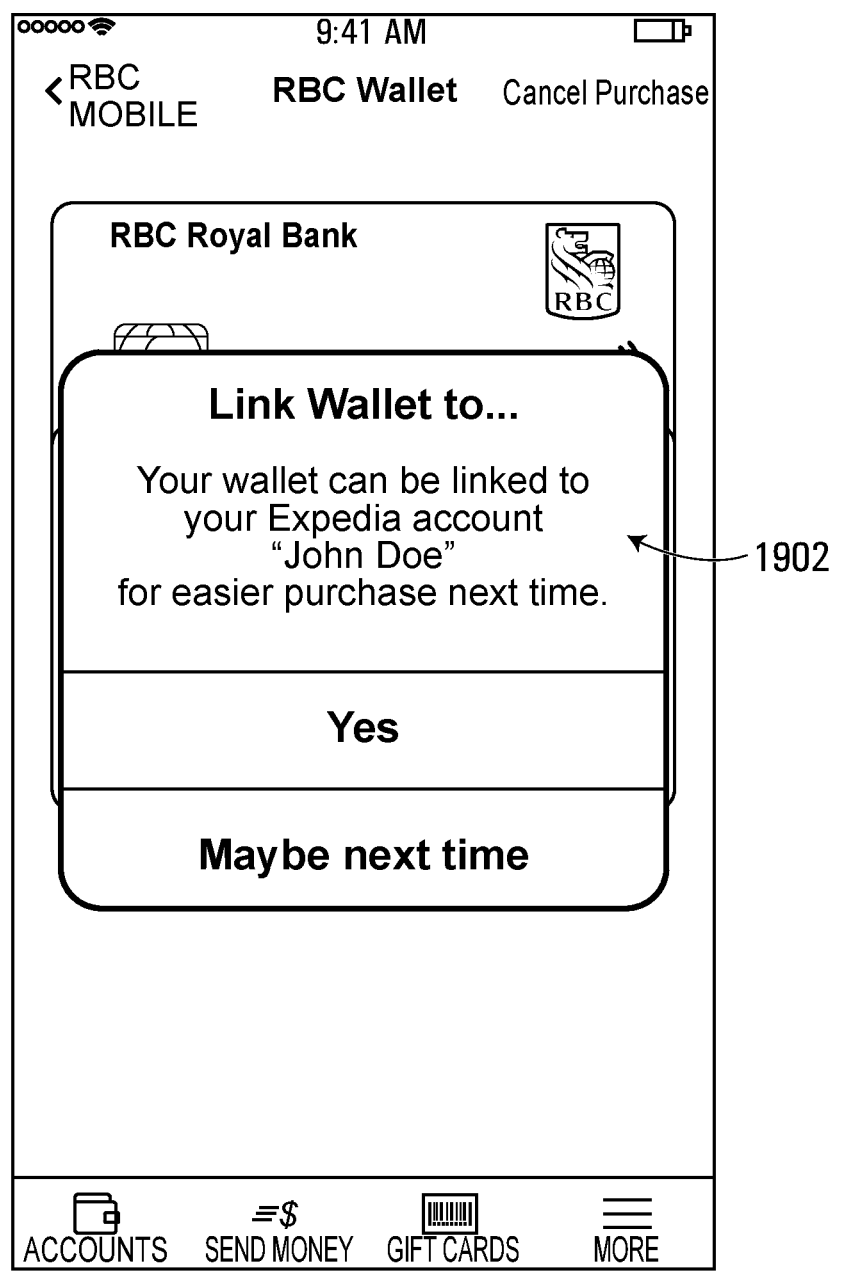
FIG. 19 is a screenshot of an interface of a mobile device of a system for transactions according to some embodiments.

FIG. 19 shows an interface for the wallet application 104 with a link request 1902 to link the wallet application 104 to the merchant user account (e.g. the customer account registered with the merchant website 106). The link enables subsequent purchases from the merchant website 106 using the wallet application 104 without requiring the initial step of reading the code using the mobile device 114.

Figure 20:
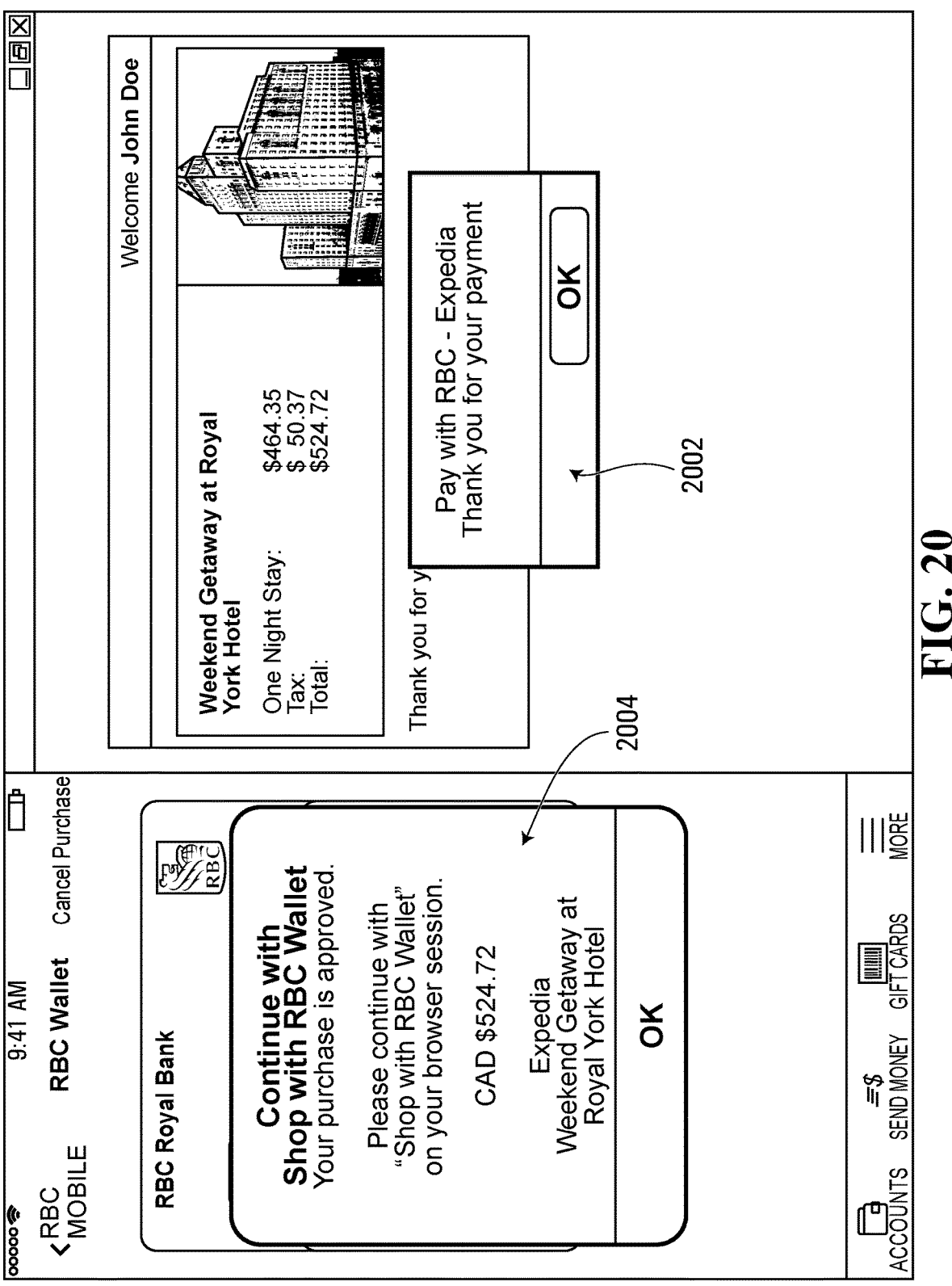
FIG. 20 is a screenshot of an interface of a mobile device and merchant website of a system for transactions according to some embodiments.

FIG. 20 shows an interface 2002 for the merchant website 106 and another interface 2004 for the wallet application 104. The interface 2004 for the wallet application indicates a purchase confirmation for the transaction. The interface 2002 for the merchant website 106 also indicates a purchase confirmation for the transaction.

Figure 21:
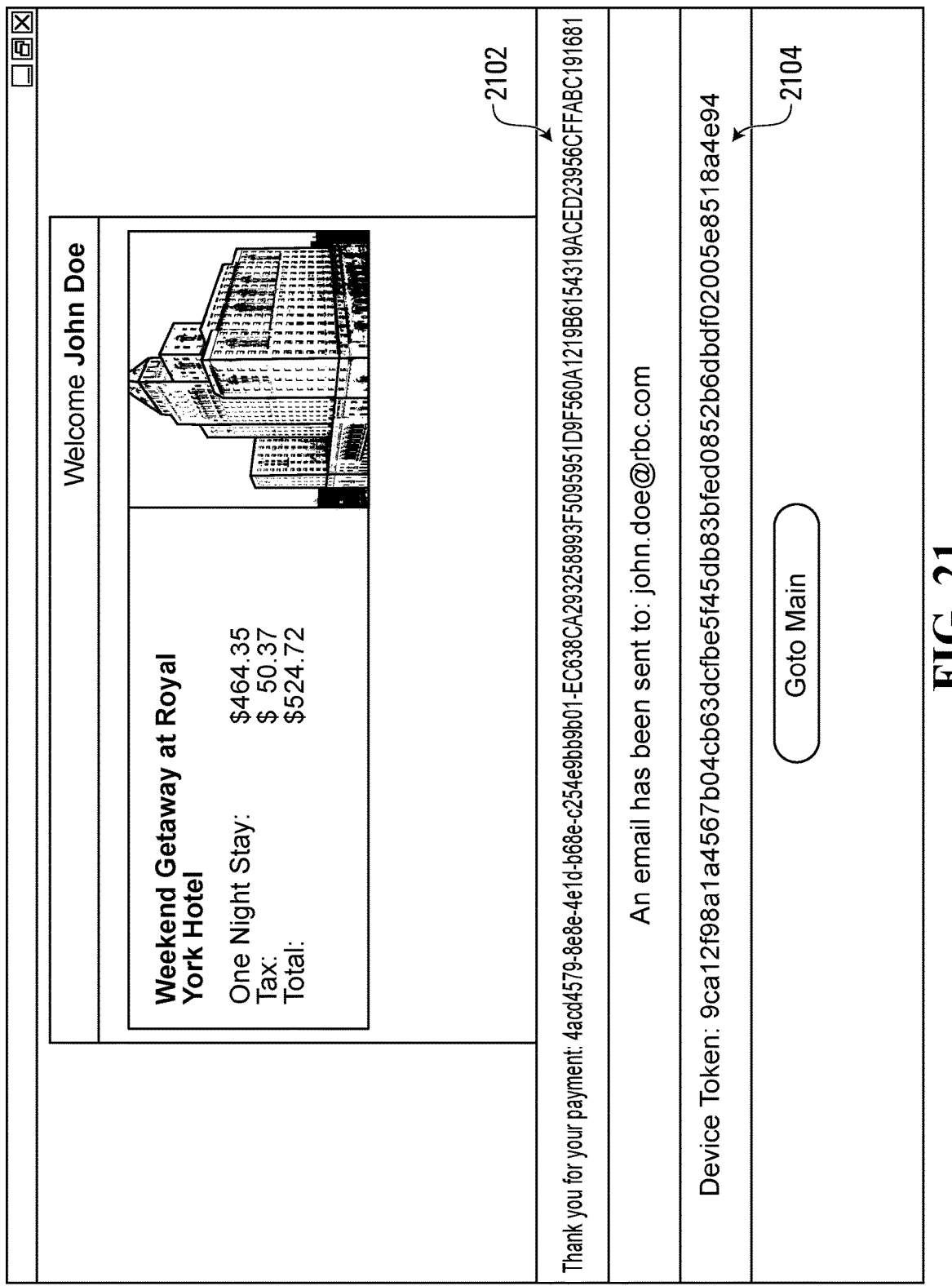
FIG. 21 is a screenshot of an interface of a merchant website of a system for transactions according to some embodiments.

FIG. 21 shows an interface for the merchant website 106 that includes a payment confirmation code 2102 and a device token identifier 2104 indicating the wallet application 104 used to process the payment. The interface also includes an indication that a confirmation message has been sent to a particular address.

FIG. 22 is a screenshot of an interface for the wallet application 104. The interface includes a form of form fields and corresponding field values. Example form fields include username, device token, merchant, notification options, and so on. The interface can be used to configure the wallet application 104 to process payments for specific merchants and merchant user accounts (e.g. consumer or user accounts registered with the merchant). The form can include selectable values to populate field values corresponding to the different form fields. The interface may be accessible after authorization by the wallet application 104, such as by biometric authentication. The interface indicates that the device token identifier for the wallet application 104 is linked to the merchant website 106 or the merchant server 108. Accordingly, the wallet application 104 can be used for subsequent purchases at the merchant website 106 without requiring the initial step of receiving the code at the wallet application 104.

Figure 23:
FIG. 23 is a screenshot of an interface of a merchant website of a system for transactions according to some embodiments.

FIG. 23 is a screenshot of an interface for a merchant website 106. The interface includes selectable indicia 1102 to trigger the payment process using the wallet application 104. The interface can also include a summary of payment details regarding a product or service offered by the merchant website 106.

Figure 24:
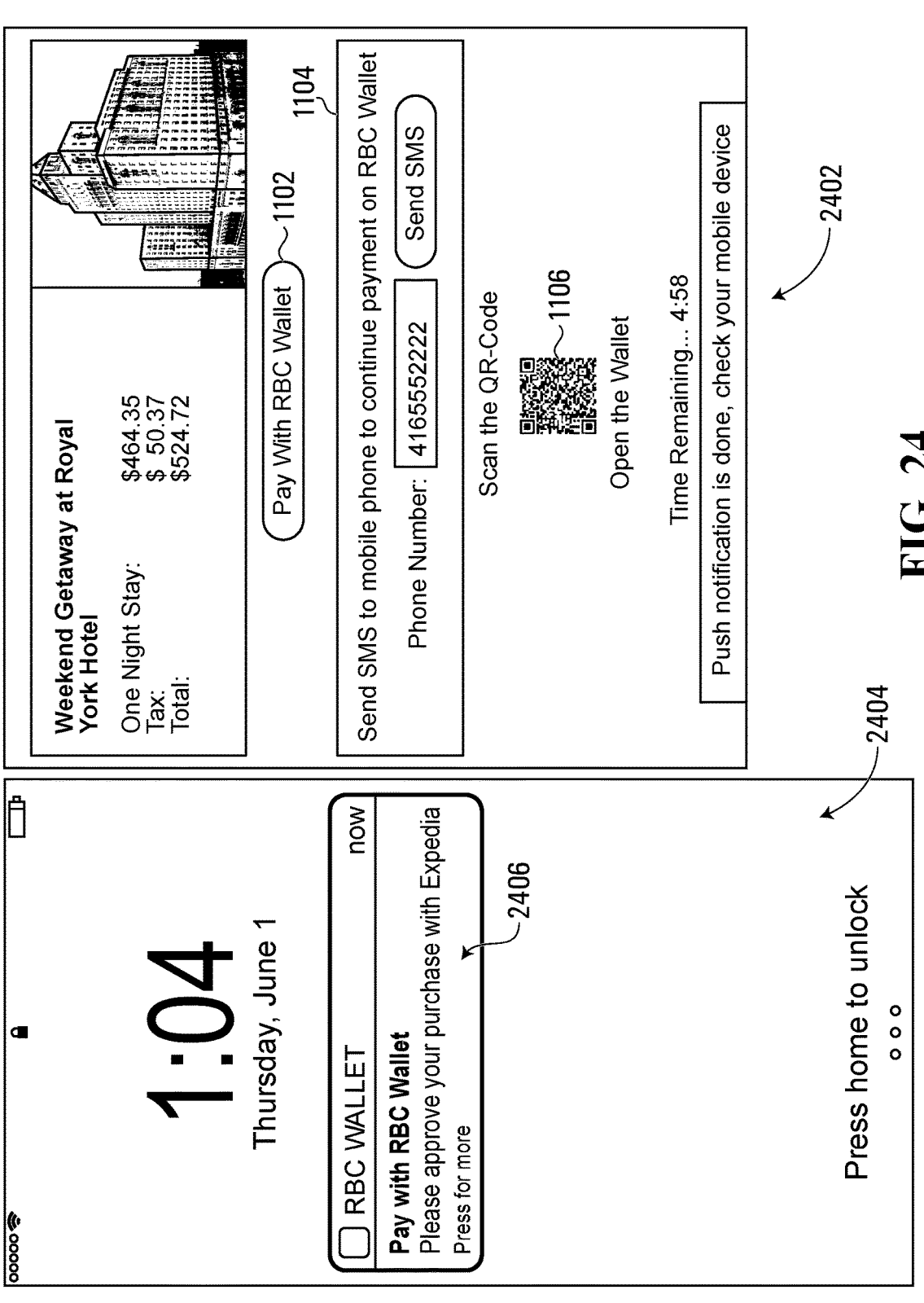
FIG. 24 is a screenshot of an interface of a mobile device and merchant website of a system for transactions according to some embodiments.

FIG. 24 shows an interface 2402 for the merchant website 106 and another interface 2404 for the wallet application 104. The interface 1604 for the wallet application 104 includes a confirmation request 2406 to approve payment for the transaction. The interface 2404 does not have to include an imaging component 1606 to capture an image of the code 1106 displayed on the merchant website 106 as the link is already created between the wallet application 104 and the merchant website 106.

Figure 25:
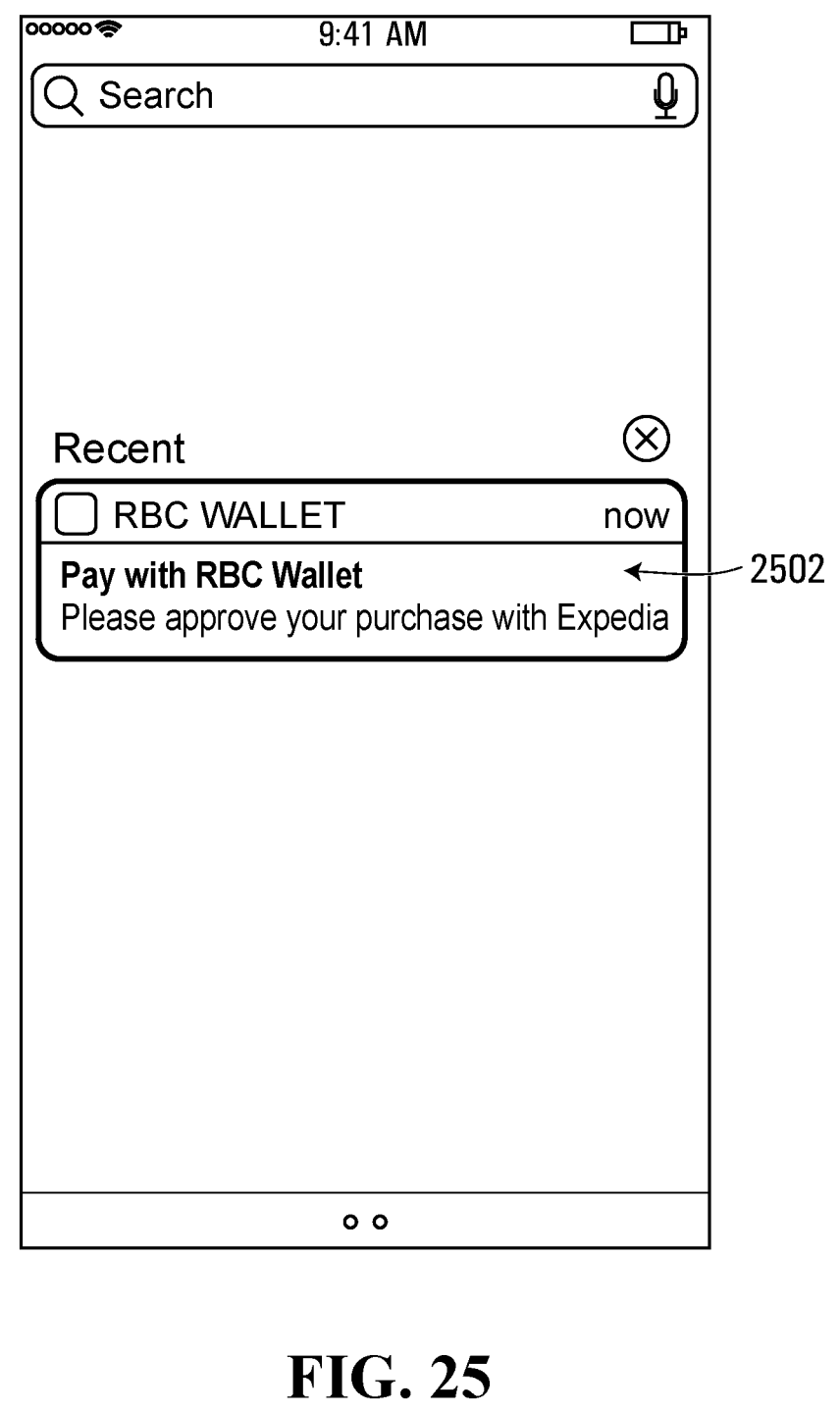

FIG. 25 shows an interface for the wallet application 104. The interface for the wallet application 104 includes a confirmation request 2502 to approve payment for the transaction. The interface does not have to include an imaging component 1606 to capture an image of the code 1106 displayed on the merchant website 106 as the link is already created between the wallet application 104 and the merchant website 106.

Figure 26:
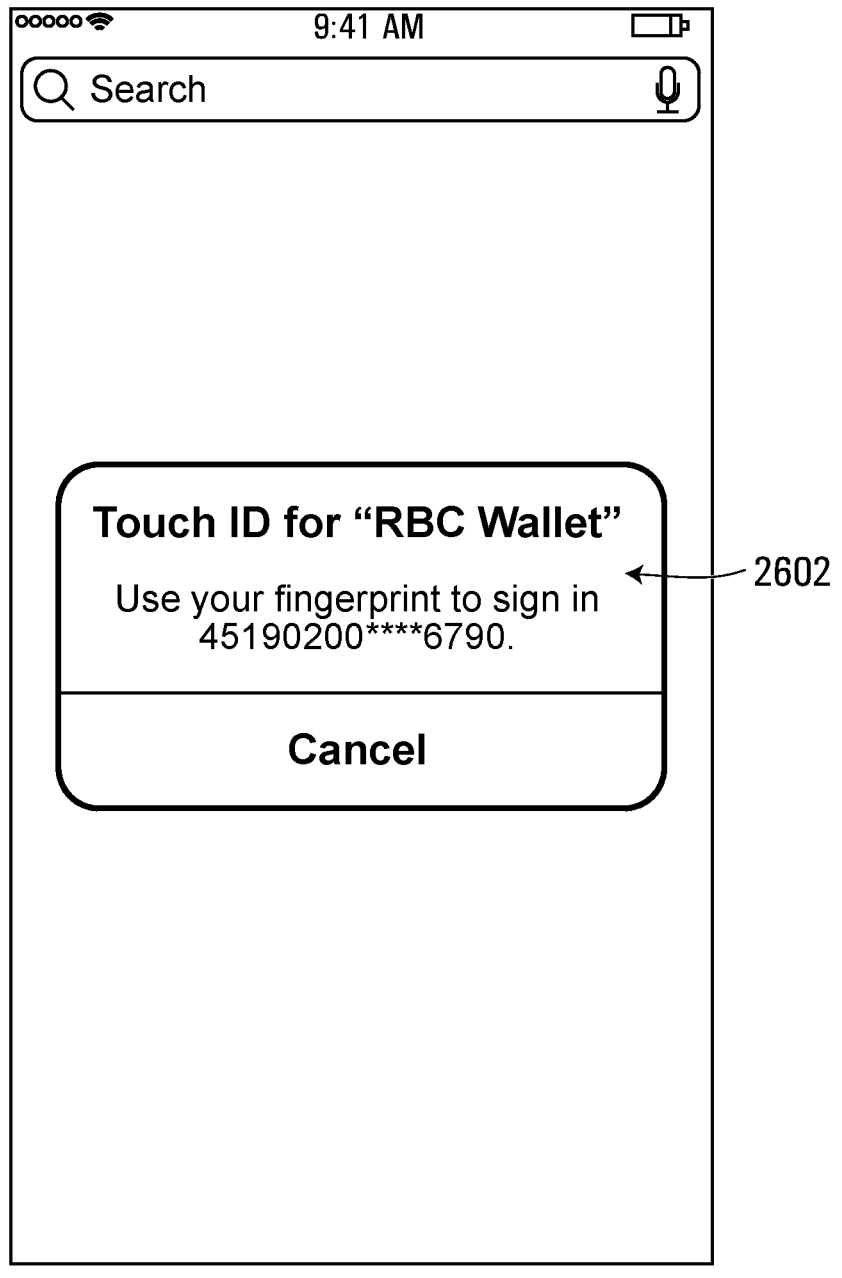
FIG. 26 is a screenshot of an interface of a mobile device of a system for transactions according to some embodiments.

FIG. 26 is a screenshot of an interface of a mobile device 114 and the wallet application 104 with indicia 2602 to authenticate a user using biometric authentication, such as a fingerprint for example.

Figure 27:
FIG. 27 is a screenshot of an interface of a mobile device of a system for transactions according to some embodiments.

FIG. 27 shows an interface for the wallet application 104 with a confirmation request 2702 to confirm a purchase option for payment of the transaction. The confirmation request 2702 can be used to select a purchase option at the wallet application 104. The confirmation request 2702 can include information regarding the merchant, the goods or services, and the total payment amount.

Figure 28:
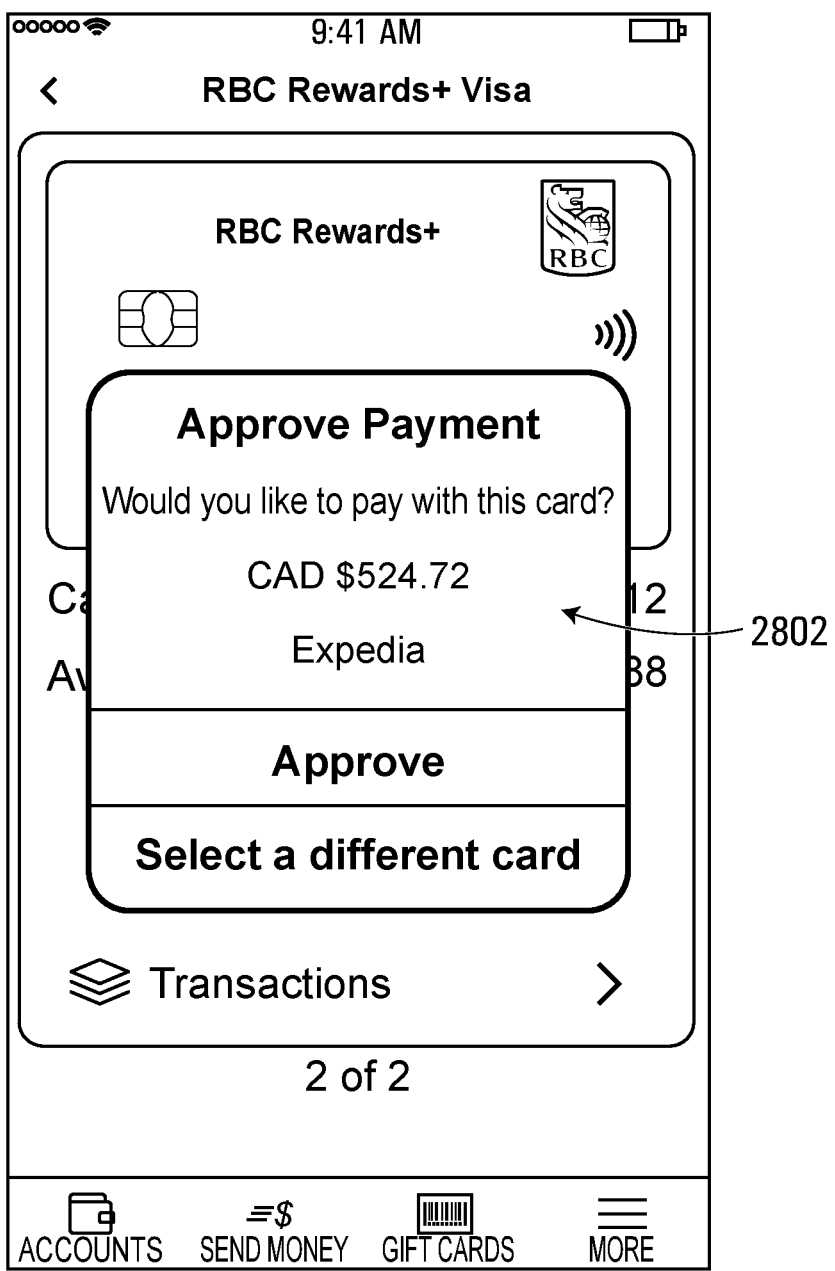
FIG. 28 is a screenshot of an interface of a mobile device of a system for transactions according to some embodiments.

FIG. 28 shows an interface for the wallet application 104 with a confirmation request 2802 to confirm payment for the transaction using the selected purchase option. The confirmation request 2802 can be used to approve payment at the wallet application 104. The confirmation request 2802 can include information regarding the merchant, the goods or services, and the total payment amount. The confirmation request 2802 can include an option to select a different purchase option.

Figure 29:
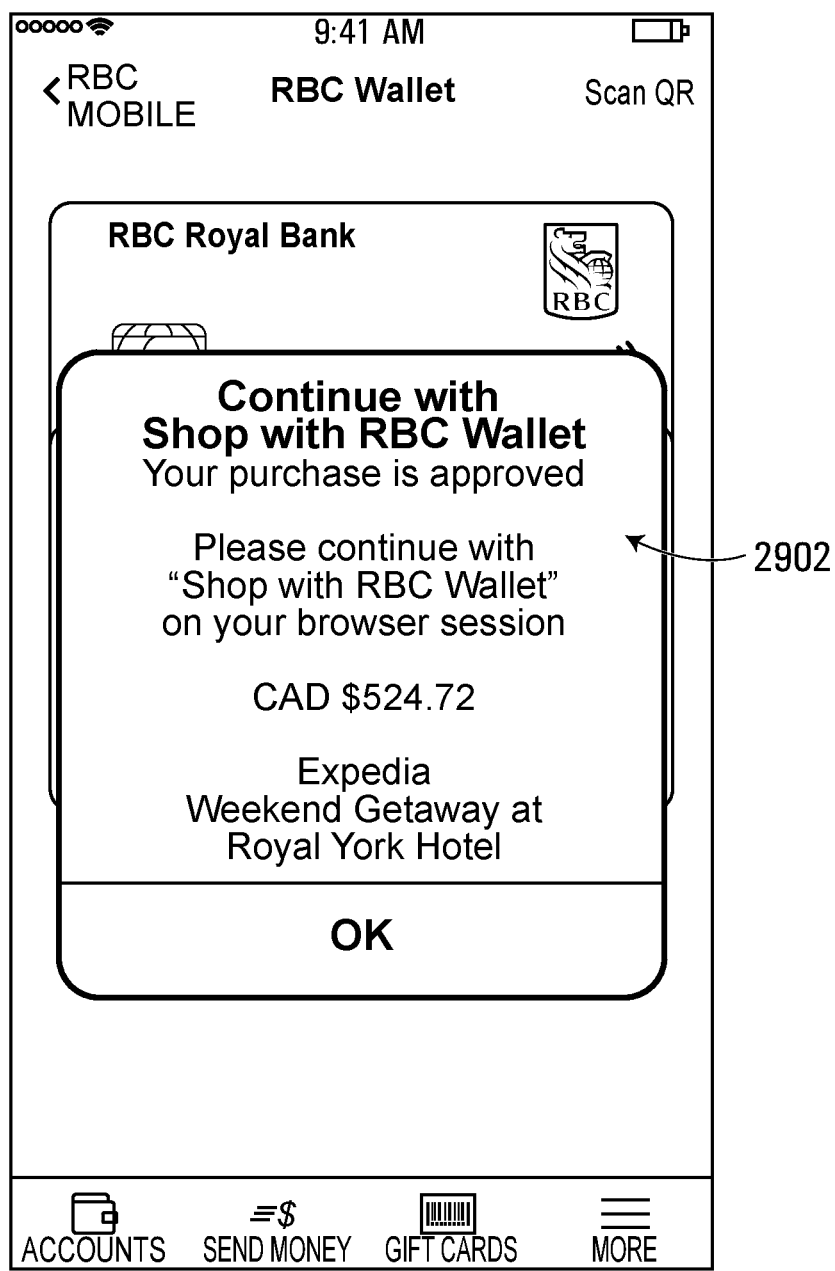
FIG. 29 is a screenshot of an interface of a mobile device of a system for transactions according to some embodiments.

FIG. 29 shows an interface for the wallet application 104 with a purchase approval 2902 for the transaction using the selected purchase option. The user can continue to shop for goods or services at the merchant website 106 for subsequent purchases.

Figure 30:
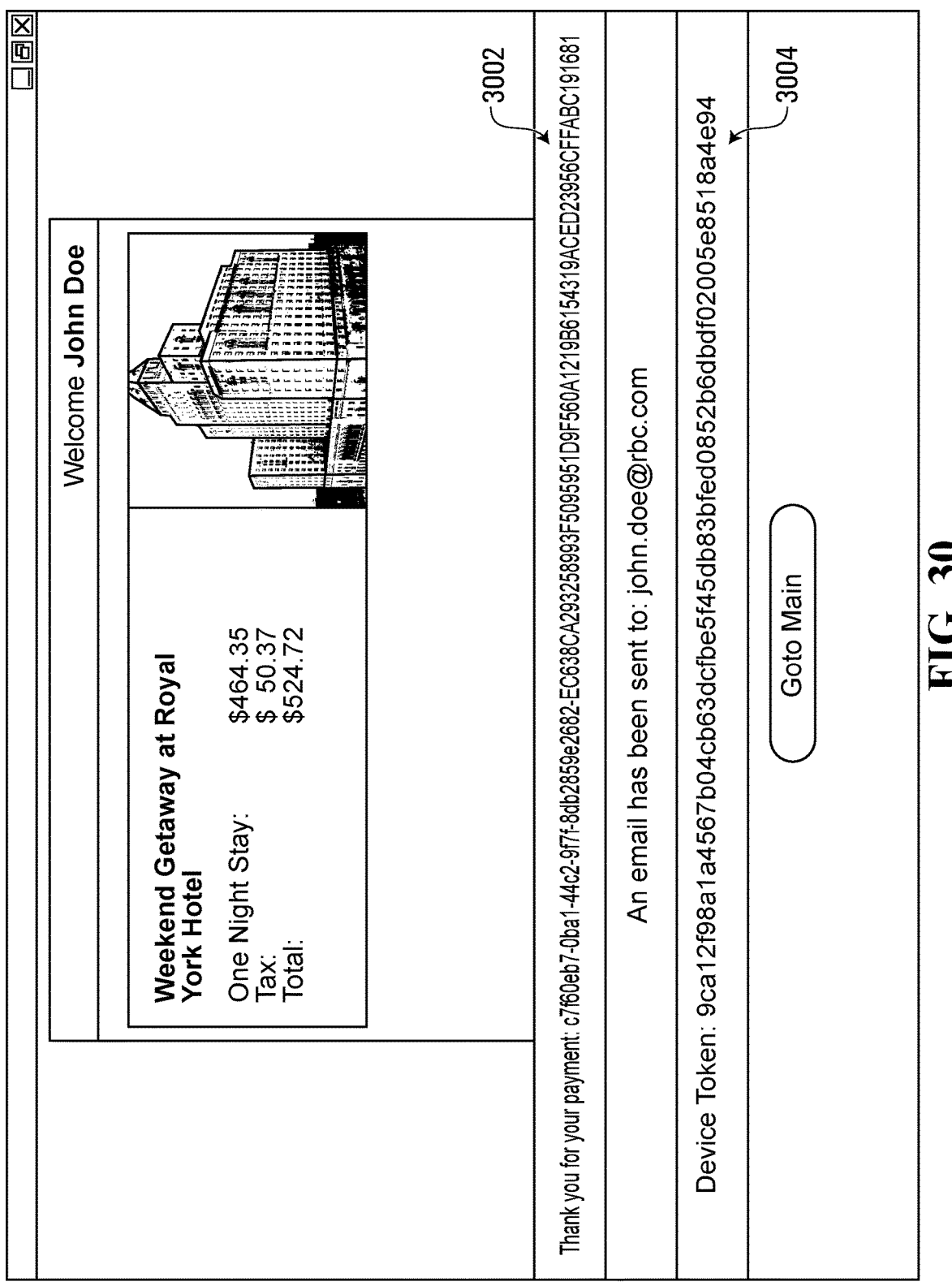
FIG. 30 is a screenshot of an interface of a merchant website of a system for transactions according to some embodiments.

FIG. 30 shows an interface for the merchant website 106 that includes a payment confirmation code 3002 and a device token identifier 3004 indicating the wallet application 104 used to process the payment. The interface also includes an indication that a confirmation message has been sent to a particular address.

FIG. 31 is a flowchart of a method 3100 for transactions according to some embodiments. The method 3100 can be implemented at the payment server 110, for example.

At 3102, the payment server 110 receives a payment request to process payment for an electronic commerce transaction from a merchant website 106. The payment request indicate a user account identifier, a merchant identifier and transaction data. The user account identifier can be a handle or a code, for example. The payment server 110 can receive the handle from a form field of the merchant website 106 as the user account identifier. The payment server 110 can receive a code as part of a request package as the user account identifier.

At 3104, the payment server 110 processes the payment request to determine the user account associated with the user account identifier. The user account identifies the electronic wallet application 114. The payment server 110 can use the user account identifier to determine a user account profile from multiple profiles stored in a repository. The profile can include the user account identifier along with an identifier for the electronic wallet application 114.

At 3106, the payment server 110 transmits a confirmation request to the electronic wallet application 114. The confirmation request includes at least a portion of the transaction data. The electronic wallet application 114 is configured to automatically display the confirmation request on a display of the mobile device 104 in order to receive confirmation from the user after it was authorized.

At 3108, the payment server 110 receives a payment confirmation from the electronic wallet application 114. For example, the confirmation request may indicate the merchant identifier along with a purchase total for the transaction for approval by the user. The user can approve the confirmation request by selecting a selectable indicia which triggers transmission of the payment confirmation from the wallet application 114 to the payment server 110.

At 3110, the payment server 110 transmits a payment package to a merchant server 108 associated with the merchant website 106. The payment server 110 transmits the payment package directly to the merchant server 108 over a secure channel. That way, if there is malicious software listening at the merchant website 106 the payment data is not transmitted there but instead goes directly to the merchant server 108 which may be in a more secure location. The payment package can be a payment security token, for example.

FIG. 32 is a flowchart of a method 3200 for transactions according to some embodiments. The method 3200 can be implemented at the wallet application 114 or mobile device 104.

At 3202, the wallet application 114 or mobile device 104 can authorize a user account. The authorization can be a login or by way of biometric verification for example.

At 3204, the wallet application 114 or mobile device 104 can receive a first handle associated with the user account. The handle can be received by way of a registration process where a user can select a unique handle to be linked to a payment account. The handle can be received from the payment server 110 as a temporary handle, for example.

At 3206, the wallet application 114 or mobile device 104 can receive a confirmation request from the payment server 110. The confirmation request can indicate a merchant and transaction data such as a payment amount along with one or more items related to the purchase. The confirmation request relates to a payment request to process payment for an electronic commerce transaction at a merchant website 106 or store. The payment request can indicate a first handle, a merchant identifier, and transaction data.

At 3208, the wallet application 114 or mobile device 104 can authorize the user account of the electronic wallet application 114.

At 3210, the wallet application 114 or mobile device 104 can transmit a payment confirmation to authorise the payment request to trigger transmission of a payment security token from the payment server 110 to a merchant server 108 associated with the merchant website. That is, the payment confirmation can include program instructions to control the payment server 110 to generate a payment security token to process the payment.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Embodiments described herein may enhance security as payment information is not required at the merchant website 106 or other third party e-commerce platforms. Further, embodiments described herein may enable multiple consumers 112 to engage in e-commerce using the same browser to access the merchant website 106 and mobile device 114. For example, different consumers 112 can use different usernames, wallet applications 104, and handles to process payments for e-commerce transactions using the same browser to access merchant website 106. Further, different consumers 114 can log into the same mobile wallet application 104 to access their respective profile or account and associated notifications or confirmations. Mobile devices 114 can be from different providers, for example.

Embodiments described herein may enable e-commerce payment transaction using a code readable by the wallet application 104 and may enable subsequent payment transactions using a link between the wallet application 104 and the merchant website 106. For example, the code can be generated using encryption keys exchanged between the merchant and a financial institution. The code can be displayed on the interface of the merchant website 106. The server 110 maps the code to the merchant user account and the merchant server 108 or merchant website 106. The mobile device 104 may be configured for biometric verification. Once verified then data can be exchanged between the wallet application 104, payment server 110, and merchant server 108 to process the payment.

Embodiments described herein may enable e-commerce payment transactions using a handle selected by the consumer 112. For example, this may be a pre-set or configured handle within the mobile wallet application 104. The handle is entered into a form field of an interface of the merchant website 106 and this process may not require a password or other payment information for improved security. The server 110 maps the handle to a mobile device 104 operated by the consumer 112. The mobile device 104 may be configured for biometric verification. Once verified, a token is exchanged between wallet application 104, payment server 110, and merchant server 108 to process the payment. The handle can relate to multi-users and the handle can map to any enabled mobile device 104 (e.g. mobile device 104 with the wallet application 114 installed thereon).

Embodiments described herein may enable e-commerce payment transactions using a time sensitive handle generated by the server 110 or mobile wallet application 114. The consumer 112 may not have set up a handle at the wallet application 114. Instead, when the consumer 112 signs into the mobile wallet application 114 it generates a time sensitive handle to enter into the e-commerce website. The handle may also be a secure token in some embodiments.

Embodiments described herein enable a consumer 112 and mobile wallet application 104 to disable the handle option, such as for an indefinite or definite time period. For example, if the consumer 112 is travelling they are able to disable the use of the handle while they are away for peace of mind.

In some embodiments, the payment server 110 receives a handle and a transaction summary of the purchase from merchant website 106 to populate notification for the mobile device 104 and mobile wallet application 114. The payment server 110 transmits a payment token to the merchant server 108 to process payment for the e-commerce transaction. The payment server 110 interacts with the mobile wallet application 114 to trigger the payment process. The merchant server 108 processes payment using the token and then sends a confirmation or notification to the merchant website 106 to display confirmation screen. The payment server 110 uses the handle to identify the corresponding mobile device 104 and mobile wallet application 114. That is, the handle may be linked to an identifier for the mobile device 104 and an identifier for the mobile wallet application 114. The payment process can occur in real-time. In some embodiments, the merchant website 106 may be accessed using mobile device 114 using a mobile browser or may be part of an application residing on a mobile device 114 or another device.

In some embodiments, the handle may be used to share other types of data or information (in addition or instead of payment data) between the payment server 110 and merchant website 106. For example, the handle may be linked to other types of data or information such as address details, email, phone; and so on to share other types of data or information between the payment server 110 and merchant website 106. The data may have an inherent level of trustworthiness as it is provided by the payment server 110 which may be a trusted data source.

In some embodiments, the purchase order may be saved by the merchant website 106 for later processing and payment. This enables an asynchronous payment approval process. If the consumer 112 cannot enter the handle right away into the merchant website 106 then the merchant website 106 can store the purchase order for later approval. In some embodiments, the merchant website 106 uses a call-back uniform resource locator to poll an address of the payment server 110 where the payment authorization is provided.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

For simplicity only one payment server 110 and mobile wallet application 104 are shown but the system may include more payment servers 110 and mobile wallet applications 104 to implement aspects of the workflow for payment processing described herein. The payment server 110 has at least one processor, a data storage device (including volatile memory or non-volatile memory or other data storage elements or a combination thereof), and at least one communication interface. The payment server 110 components may be connected in various ways including directly coupled, indirectly coupled via a network, and distributed over a wide geographic area and connected via a network (which may be referred to as "cloud computing").

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A payment processing system for a transaction at a merchant website, the system comprising:

a cloud server that receives a request package from the merchant website, the request package comprising transaction data, a customer account identifier for the merchant website, and a merchant identifier, wherein the request package is signed with a merchant key;

a merchant server;

a mobile device;

a payment server having a processor with a secure connection to the mobile device, the cloud server, and the merchant server;

the merchant server:

generates an encryption key unique to the merchant, by registering with the payment server, and decrypts an encrypted payment security token using a corresponding key;

an interface for the merchant website, wherein the interface comprises selectable indicia triggering payment for the transaction using an electronic wallet application and a code readable by the electronic wallet application, wherein the code is created and encrypted using one or more encryption keys exchanged between the payment server and the merchant server, wherein the one or more encryption keys includes the encryption key unique to the merchant, wherein the code is encrypted using the encryption key unique to the merchant, wherein the code does not indicate sensitive financial data, wherein the code does not include payment information and/or personally identifiable information;

a database linking the customer account identifier to an electronic wallet application identifier for the customer account, wherein the merchant server processes subsequent transactions using the database and the customer account identifier linked to the electronic wallet application identifier for the customer account, the database having a database record comprising the electronic wallet application identifier, the merchant identifier and the customer account identifier, wherein the database record identifies the electronic wallet application and links the customer account to the electronic wallet application using the electronic wallet application identifier, wherein the payment server generates the electronic wallet application identifier and adds the electronic wallet application identifier to the request package for the merchant server to efficiently process the subsequent transactions;

the mobile device with a communication interface, at least one processor and non-transitory computer readable medium storing the electronic wallet application with computer-executable instructions for the at least one processor, wherein, using the electronic wallet application, the mobile device:

reads the code using a camera of the mobile device and decrypts or decodes the code and obtains a reference to the request package and retrieves the request package using the reference;

transmits, using the communication interface, the reference to the request package and the wallet application identifier to the payment server;

displays, on a display of the mobile device, a request for payment confirmation received from the payment server in response to transmitting the reference to the request package, the request for the payment confirmation comprising a portion of the transaction data and the merchant identifier;

transmits, using the communication interface, a transaction approval in response to displaying the request; and sends tokenized data representing a selected payment method;

the payment server:

receives the reference to the request package and the wallet application identifier from the electronic wallet application;

transmits the reference to the request package to the cloud server, and uses the reference and the request package to process the transaction, wherein the payment server does not provide sensitive payment information to the merchant website for the transaction;

receives the request package from the cloud server and retrieves the portion of the transaction data, the customer account identifier, and the merchant identifier from the request package;

transmits the portion of the transaction data retrieved from the request package to the electronic wallet application for the request for payment confirmation;

receives the transaction approval to the request for payment confirmation from the mobile device;

transmits an approval message that updates the merchant website with a payment confirmation notification;

encrypts a payment security token by locating the encryption key unique to the merchant using the merchant identifier, wherein the payment server has different keys for different merchant servers; and transmits a payment package to the cloud server, the payment package comprising the encrypted payment security token, confirmed payment amount to process payment for the transaction, the transaction approval for the transaction at the merchant website, the customer account identifier of the merchant website, the wallet application identifier, and the merchant identifier;

wherein the cloud server transmits the request package to the payment server, sends a notification with a reference identifier for the payment package to the merchant server, wherein the merchant server retrieves the payment package from the cloud server to complete payment for the transaction, wherein the cloud server provides a notification of the transaction to the merchant website to display the transaction confirmation.

2. The system of claim 1, wherein the payment server performs a look up for the electronic wallet application identifier using a repository of user account profiles.

3. The system of claim 1, wherein the mobile device:

receives notification of an additional transaction request and additional transaction data;

displays an additional purchase request comprising the additional transaction data; and transmits a transaction approval to the payment server.

4. The system of claim 1, wherein the mobile device verifies the request package using the merchant identifier.

5. The system of claim 4, wherein the payment server decrypts the request package by retrieving a key using the merchant identifier.

6. The system of claim 1, wherein the electronic wallet application decrypts or decodes data in the code.

7. The system of claim 1, wherein the encryption key is exchanged between the payment server and the merchant server in order to secure data.

8. The system of claim 1, wherein the transaction approval comprises a payment type.

9. The system of claim 1, wherein the code is temporary and valid for a limited use.

10. The system of claim 1, wherein receiving the transaction approval to the request for payment confirmation comprises receiving a payment option from a plurality of payment options.

11. The system of claim 1, wherein the payment server:

receives notification of an additional transaction request and additional transaction data;

receives an additional transaction approval to process payment for the additional transaction; and transmits an additional payment package to the cloud servicer, the payment package comprising the additional transaction approval, the customer account identifier, and the merchant identifier.

12. A method for a transaction at a merchant website, the method comprising:

receiving, at a cloud server, a request package from the merchant website, the request package comprising transaction data, a customer account identifier for the merchant website, and a merchant identifier, wherein the request package is signed with a merchant key;

creating and encrypting a code using one or more encryption keys exchanged between a payment server and a merchant server, wherein the code does not indicate sensitive financial data, wherein the one or more encryption keys includes an encryption key unique to the merchant, wherein the code is encrypted using the encryption key unique to the merchant, wherein the payment server does not provide payment information and/or personally identifiable information to the merchant website;

providing, at an interface for the merchant website, selectable indicia, wherein the selectable indicia triggers payment for the transaction using an electronic wallet application and wherein the electronic wallet application reads the code readable by the electronic wallet application;

authorizing a user account of an electronic wallet application on or accessible by a mobile device and generating a wallet application identifier for the user account;

linking, by a database, the customer account identifier to the wallet application identifier for the user account, wherein the merchant server processes subsequent transactions using the database and the customer account identifier linked to the wallet application identifier for the customer account;

storing, in a database record of the database, the wallet application identifier, the merchant identifier, and the customer account identifier;

reading the code using a camera of the mobile device and obtaining a reference to the request package by decrypting or decoding the code so that the request package can be retrieved using the reference;

transmitting the reference to the request package and the wallet application identifier to the payment server, wherein the reference and the request package are used to process the transaction so that sensitive payment information is not provided to the merchant website for the transaction;

displaying a request for payment confirmation in response to transmitting the reference to the request package;

authenticating a user of the authorized user account;

transmitting a transaction approval to the payment server in response to displaying the request;

sending tokenized data representing a selected payment method;

storing different keys for different merchant servers using the payment server;

registering the merchant server with the payment server to generate an encryption key unique to the merchant;

encrypting a payment security token using the payment server and obtaining the encryption key unique to the merchant using the merchant identifier;

transmitting a payment package from the payment server to the cloud server, the payment package comprising the encrypted payment security token, confirmed payment amount to process payment for the transaction, the transaction approval for the transaction at the merchant website, the customer account identifier of the merchant website, the wallet application identifier, and the merchant identifier;

sending, by the cloud server, a notification with a reference identifier for the payment package to the merchant server;

retrieving, by the merchant server, the payment package from the cloud server to complete payment for the transaction; and decrypting, by the merchant server, the encrypted payment security token using a corresponding key.

13. The method of claim 12 further comprising:
performing a look up for the wallet application identifier using a repository of user account profiles.

14. The method of claim 12 further comprising:
receiving notification of an additional transaction request and additional transaction data;
displaying an additional purchase request comprising the additional transaction data;
receiving an additional transaction approval to process payment; and
transmitting the transaction approval to the payment server.

15. The method of claim 12 further comprising verifying the request package using the merchant identifier.

16. The method of claim 15, wherein the request package is encrypted using a first key and the merchant identifier and wherein the verifying comprises using a second key and the merchant identifier and decrypting the request package.

17. The method of claim 12 further comprising decrypting or decoding data in the code.

18. The method of claim 12 further comprising encrypting the code by a key and the merchant identifier.

19. The method of claim 12, wherein the transaction approval comprises a payment type.

20. The method of claim 12, wherein receiving the transaction approval to the request for payment confirmation comprises receiving a payment option from a plurality of payment options.

21. A system comprising a cloud server, an interface for a merchant website, and a payment server, wherein the cloud server receives a request package from a merchant website, the request package comprising transaction data, a customer account identifier for the merchant website, and a merchant identifier, wherein the request package is signed with a merchant key, wherein the interface comprises selectable indicia, wherein the selectable indicia triggers payment for the transaction using an electronic wallet application and wherein the electronic wallet application reads a code, wherein the code is created and encrypted using one or more encryption keys exchanged between the payment server and a merchant server, wherein the one or more encryption keys includes an encryption key unique to the merchant, wherein the code is encrypted using the encryption key unique to the merchant, wherein the code does not indicate sensitive financial data, wherein the payment server does not provide payment information and/or personally identifiable information to the merchant website, the payment server comprising:
a database linking the customer account identifier to an electronic wallet application identifier for the customer account, wherein the merchant server efficiently processes subsequent transactions using the database and the customer account identifier linked to the electronic wallet application identifier for the customer account, the database having a database record with the electronic wallet application identifier, the merchant identifier and the customer account identifier, wherein the database record identifies the electronic wallet application and links the customer account to the electronic wallet application using the electronic wallet application identifier, wherein the payment server generates the electronic wallet application identifier and adds the electronic wallet application identifier to the request package for the merchant server to process the subsequent transactions;

a communication interface, and at least one processor coupled to non-transitory computer-readable storage medium with computer-executable instructions for the processor, wherein, using the processor to execute the computer-executable instructions to automatically trigger control actions, the payment server:

receives a reference to the request package by establishing a secure connection with a mobile device with the electronic wallet application that reads the code to obtain the reference to the request package so that the request package can be retrieved using the reference, wherein the reference and the request package are used to process the transaction so that sensitive payment information is not provided to the merchant website for the transaction;

transmits the reference to the cloud server using the communication interface;

receives the request package from the cloud server in response to transmitting the reference;

transmits, using the communication interface, a portion of the transaction data from the request package or the reference to the request package;

receives a transaction approval to a request for payment confirmation from the mobile device;

sends tokenized data representing a selected payment method;

encrypts a payment security token by locating a key using the merchant identifier, the encrypted payment security token decrypted by the merchant server using a corresponding key; and transmits a payment package to the cloud server, the payment package comprising the encrypted payment security token decrypted by the merchant server, confirmed payment amount to process payment for the transaction, the transaction approval, the customer account identifier, and the merchant identifier;

wherein the cloud server sends a notification with a reference identifier for the payment package to the merchant server, wherein the merchant server retrieves the payment package from the cloud server to complete payment for the transaction.

22. The payment server of claim 21, wherein the at least one processor:
performs a look up for the electronic wallet application identifier using a repository of user account profiles.

23. The payment server of claim 21, wherein the at least one processor:
receives notification of an additional transaction request and additional transaction data;
receives an additional transaction approval to process payment for the additional transaction; and
transmits an additional payment package to the cloud server, the payment package comprising the additional transaction approval, the customer account identifier, and the merchant identifier.

24. The payment server of claim 21, wherein the cloud server sends a notification with a reference identifier for the payment package to the merchant server, wherein the merchant server retrieves the payment package from the cloud server to complete payment for the transaction.

* * * * *